(12) United States Patent
Vemparala et al.

(10) Patent No.: US 11,756,146 B2
(45) Date of Patent: Sep. 12, 2023

(54) ARTIFICIAL INTELLIGENCE SYSTEM AND METHOD FOR PERFORMING SETTLEMENTS BASED ON ACTIVITY OF USERS

(71) Applicants: Srikant Vemparala, Redmond, WA (US); SETTLEKING LLC, Redmond, WA (US)

(72) Inventors: Srikant Vemparala, Redmond, WA (US); Thomas Todaro, Seattle, WA (US); Andrew Sack, Seattle, WA (US); Sriram Sunkari, Bothell, WA (US); Prabodh Reddy Kommidi, Sammamish, WA (US); Mike Snow, Carnation, WA (US); Narendra Padala, Rajahmundry Rural (IN)

(73) Assignee: SettleKing INC, Bellevue, WA (US)

( * ) Notice: Subject to any disclaimer, the term of this patent is extended or adjusted under 35 U.S.C. 154(b) by 70 days.

(21) Appl. No.: 17/238,236

(22) Filed: Apr. 23, 2021

(65) Prior Publication Data
US 2022/0343450 A1   Oct. 27, 2022

(51) Int. Cl.
| G06Q 20/40 | (2012.01) |
| G06Q 50/34 | (2012.01) |
| G06N 20/00 | (2019.01) |
| G06Q 20/06 | (2012.01) |
| G06Q 20/38 | (2012.01) |
| H04L 9/40  | (2022.01) |

(52) U.S. Cl.
CPC ............ *G06Q 50/34* (2013.01); *G06N 20/00* (2019.01); *G06Q 20/06* (2013.01); *G06Q 20/389* (2013.01); *G06Q 20/405* (2013.01)

(58) Field of Classification Search
None
See application file for complete search history.

(56) References Cited

U.S. PATENT DOCUMENTS

| 9,767,651 B2 * | 9/2017 | Fine ................. G07F 17/3225 |
| 2015/0170254 A1 * | 6/2015 | Van Biljon ............ G06Q 30/06 705/26.81 |
| 2021/0256808 A1 * | 8/2021 | Palmisano .......... G07F 17/3255 |

* cited by examiner

*Primary Examiner* — Bruce I Ebersman
*Assistant Examiner* — Bhavin D Shah
(74) *Attorney, Agent, or Firm* — Steven A. Nielsen; www.NielsenPatents.com

(57) ABSTRACT

Exemplary embodiments of the present disclosure directed towards an artificial intelligence system and method for performing settlements based on activity, user groups, and set of virtual/physical entities. The artificial intelligence system comprises artificial intelligence settlement engine configured to enable users for activity and provide activity templates to the artificial intelligence settlement engine from the computing device by the users. Customize the activity templates fully/partially based on dynamic needs and then provide the customized activity templates to the artificial intelligence settlement engine. The artificial settlement engine configured to integrate settlement process steps and/or rules into the settlement process sequence on the artificial intelligence settlement engine and then map settlement process steps and/or rules with the activity templates by the artificial intelligence settlement engine. The artificial settlement engine configured to identify shortest paths on the computing device to settle amount between users by using dynamic parameters and/or settlement process steps and/or rules.

6 Claims, 19 Drawing Sheets

| XYZ | Guests | | | ♆ ♢ Ⓝ narendrapadala@gmail.com ▾ |
|---|---|---|---|---|
| ⊚ Activity | Note: Have a friend that isnt on Xyz but needs to be notified of a settlement ? The host can create them as a Guest and map them in the create game (live or online) page. | | | |
| ⊠ Invite link | | | | |
| ⊕ Friends | | | | |
|   Friends | | | | 606 ⟶ Create Guest |
|   Guests | | | | |
| ⊕ Settle poker games | No. | Name | Email | Phone | Created On | 602 Action 604 |
| | 1 | President | President@President.com | | Feb 3, 2021, 12:50:57 PM | ✎ 🗑 |
| ⊙ Feedback & Support | 2 | Architect | Architect@Architect.com | | Feb 3, 2021, 12:50:45 PM | ✎ 🗑 |
| | 3 | Hammer | Hammer@Hammer.com | | Feb 3, 2021, 12:50:36 PM | ✎ 🗑 |
| | 4 | z | | | Jan 3, 2021, 1:19:07 AM | ✎ 🗑 |
| | 5 | y | | | Jan 3, 2021, 1:19:03 AM | ✎ 🗑 |
| | Items per page: 5 ▾    1-5 of 34   \|<   <   >   >\| | | | | |

- XYZ
- ● Activity
- ✉ Invite link
- 👥 Friends
- 💳 Settle poker games
  - Settle Live (in person) game
  - Settle Pokerrr2 game
  - Settle 'All Other' Poker app game
- Managed games
- Played games
- Poker Bankroll
- 💬 Feedback & Support

816 — Host (Optional)

Settlement email will be sent on behalf of the 'Host'. Any pokerrr2 tips, expenses are assigned to the host.

SELECT HOST — 816a
Narendra Padala

Your current host selection is : Narendra Padala — 818

Rules (Optional)

Route all payments through host. Host will receive money from all players that owe money and will send money to all players that won. 818a 818b ○ Yes ● No Route all payments through host?

You can create a rule to assign or not assign players to each other during settlement. For ex: Teddy does not want to pay James'

SELECT PAYER 818c   SELECT PAYEE 818d   818e  818f
Narendra Padala ▼   xy@abh.com ▼   ● Assign ○ Do Not Assign   [Add] — 818g

— 820

Expenses (Optional)

Have dinner expenses or pokerrr2 gold coin expenses to share with players? Capture them here to be accounted for during settlement.

Expenses per person ● Winners ○ All Players
                     820a   820b

XYZ — Settlement for all 'Other Poker Apps' — 👥 🔔 Ⓝ narendrapadaia@gmail.com⌄

- Activity
- Invite link
- Friends
- Settle poker games
  - Settle Live (in person) game
  - Settle Pokerr2 game — 902
  - Settle 'All Other' Poker app game
- Managed games — 906
- Played games — 908
- Poker Bankroll
- Feedback & Support ∅ Create Settlement ──────────────── ②Settle Settle

- Add players from your SettleKing friends list that played the your are trying to settle.
- If the player is not on SettleKing enter their email id instead.

[Add Friends] — 904a  OR  [Enter player email.] — 904b [Add] — 904c

- Capture the net amount won or lost by the player in the 'Net Amount' column.
- Adjustment. Custom adjustments if any can be made to the settlement data. Note that this has to sum up to 0.
- Use the 'email preview' button to see how your settlement email looks.
- Use the 'Settle' button to send the settlement email.

| Friends | Expenses & Tips | Net Amount (0.00) | Total (0.00) |
|---|---|---|---|
| ⊗ 🏍 Narendra Padaia | 0.00 | 0 | 0.00 |
| | Net Total (0.00) | | Total (0.00) |

FIG. 9

XYZ

- Activity
- Invite link
- Friends
- Settle poker games
  - Settle Live (in person) game
  - Settle Pokerr2 game
  - Settle 'All Other' Poker app game
- Managed games
- Played games
- Poker Bankroll
- Feedback & Support  ← 1002

Bankroll  ← 1003

Note

Click Here to toggle.
When set to ON, you will be able to track your bankroll from games settled via SettleKing over time. When set to OFF, you will not be able to track your poker bankroll on SettleKing.

[Enter a date range] 🔍 Search  Cancel                                    Add Transaction
     1004a            1004b  1004c                                          1004d
                                          1004

| No. | Created On | Description | Debit | Credit | Balance | Action |
|-----|------------|-------------|-------|--------|---------|--------|
| 1 | Feb 19, 2021, 9:24:05 AM | Re-enabled transaction for the Pokerr2 Test Game | | 3,000.00 | 0.00 | ✎ |
| 2 | Feb 19, 2021, 9:23:28 AM | Played Pokerr2 Test Game | 3,000.00 | | -3,000.00 | ✎ |
| 3 | Jan 11, 2021, 2:17:44 PM | Naren | 100.00 | | 0.00 | ✎ |
| 4 | Dec 15, 2020, 11:40:02 PM | Principal amounts | | 100.00 | 100.00 | ✎ |

Items per page: 5 ▾   1-4 of 4   |< < > >|

FIG. 10

ARTIFICIAL INTELLIGENCE SYSTEM AND METHOD FOR PERFORMING SETTLEMENTS BASED ON ACTIVITY OF USERS

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to an artificial intelligence system. More particularly, the invention relates to the artificial intelligence system and method for performing settlements based on an activity, user groups, and set of virtual/physical entities.

BACKGROUND

Generally, a number of aspects related to poker gaming and operation are increasingly sophisticated. Nowadays, technological advancements contribute to a heightened desire to visit and participate in poker gaming activities at a particular casino. The technological advancements, like card shuffling machines, chip handling devices, etc., enhance the user's perception and fairness. As a result, poker gaming is highly popular activity in today's society. Often times, a particular individual's enjoyment of the casino gaming experience is predicated upon having a sufficient supply of money that in turn allows the customer to participate in gaming activities for some time. In regular, the customer brings the sufficient amount of currency with him/her to the gaming center. Manual efforts involved in settling the payments between people, some settlements require excel with complex formulae. The process is even more difficult when the number of people involved is more than —20, some poker games have more than 350 people.

When settlement rules come into picture (for example, A→B is required, B→C not allowed etc), the settlement process becomes much more difficult. Tedious job to follow-up with pending settlements. Some online games perform partial settlements, however sending reminders and following up is still difficult process. Considering buy-ins for settlement process is additional head-ache step. Reuse of "previous configurations and settlement rules" is not in practice, which adds a lot of time and effort.

In the light of the aforementioned discussion, there exists a need for a certain system with novel methodologies that would overcome the above-mentioned disadvantages.

SUMMARY

The present invention overcomes shortfalls in the related art by presenting an unobvious unique combination and configuration of methods and components to perform settlements based on an activity, user groups, and set of virtual/physical entities.

An objective of the present disclosure is directed towards an artificial intelligence system offers easy way of on-boarding users and groups into a settlement process.

Another objective of the present disclosure is directed towards the artificial intelligence system performs the settlements based on activity templates, user groups, and set of virtual/physical entities.

Another objective of the present disclosure is directed towards the artificial intelligence system offers customization over settlement process steps based on various templates and activity rules.

Another objective of the present disclosure is directed towards the artificial intelligence system offers payment transactions with many payment gateways.

Another objective of the present disclosure is directed towards the artificial intelligence system generates notifications on pending payments to an individual or group of users and provides acknowledgements on successful payments.

Another objective of the present disclosure is directed towards the artificial intelligence system notifies one or more users with detailed information when custom rules conflict with a settlement process.

Another objective of the present disclosure is directed towards the artificial intelligence system offers integration with external services/systems to import/export data with.

Another objective of the present disclosure is directed towards the artificial intelligence system retains previously used configurations and settlement rules if required.

Another objective of the present disclosure is directed towards the artificial intelligence system ensures the privacy of data of individuals and groups, and offers secured data processing of settlements.

Another objective of the present disclosure is directed towards the artificial intelligence system maintains the history of transactions for future references.

In an embodiment of the present disclosure, a method for performing settlements based on one or more game activities of one or more users, comprising: enabling the one or more users on an artificial intelligence settlement engine to provide one or more predefined activity templates and managing one or more settlement rules in the artificial intelligence settlement engine from a computing device; mapping the one or more settlement rules with the one or more predefined activity templates on the computing device by the artificial intelligence settlement engine; notifying at least one of: success of the one or more settlement rules; and failure of the one or more settlement rules; to the one or more users on the computing device; mapping a notification process with one or more notification templates and also mapping with the one or more activity templates on the computing device by the artificial intelligence settlement engine; automatically customizing the one or more settlement rules based on various factors on the computing device by the artificial intelligence settlement engine; and identifying one or more shortest paths by the artificial intelligence settlement engine to perform one or more settlements between the one or more users for the one or more game activities using at least one of: one or more dynamic parameters; and the one or more settlement rules; on the computing device. The one or more settlements comprise one or more pending payment settlements and one or more game settlements.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 1 depicts a schematic representation of the artificial intelligence system for performing settlements based on an activity, user groups, and set of virtual/physical entities, in accordance with one or more exemplary embodiments.

FIG. 6 is an example diagram 600 depicting the guest's screen, in accordance with one or more exemplary embodiments.

FIG. 7B is another example diagram 700b depicting a view live game screen, in accordance with one or more exemplary embodiments.

FIG. 8A, FIG. 8B, FIG. 8C are example diagrams 800a, 800b, 800c depicting the poker settlement screens, in accordance with one or more exemplary embodiments.

FIG. 9 is an example diagram 900 depicting other poker apps screen, in accordance with one or more exemplary embodiments.

FIG. 10 is an example diagram 1000 depicting a poker bankroll screen, in accordance with one or more exemplary embodiments.

Figure 1:
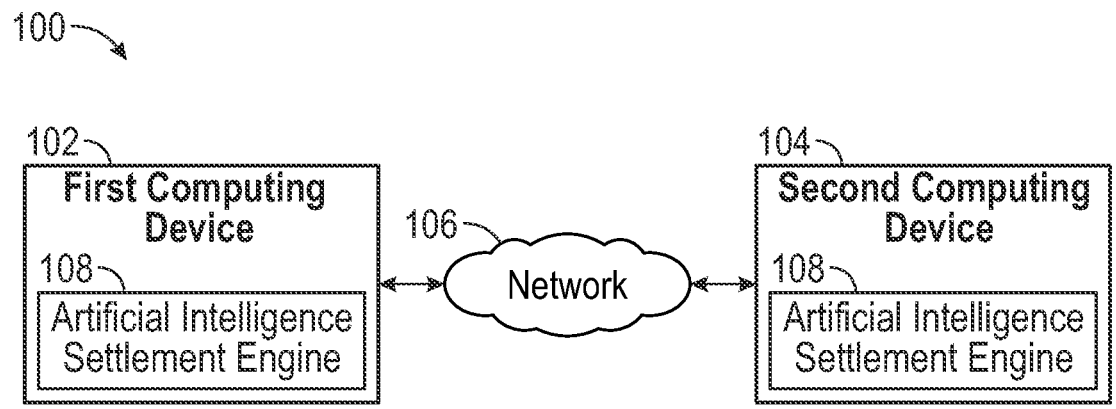
FIG. 1 is a block diagram representing a system in which aspects of the present disclosure can be implemented. Specifically.

Furthermore, the objects and advantages of this invention will become apparent from the following description and the accompanying annexed drawings.

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1, FIG. 1 is a block diagram 100 representing a system in which aspects of the present disclosure can be implemented. Specifically, FIG. 1 depicts a schematic representation of an artificial intelligence system for performing settlements based on an activity, user groups, and set of virtual/physical entities, in accordance with one or more exemplary embodiments. The artificial intelligence system 100 includes a first computing device 102, and a second computing device 104 operatively coupled to each other through a network 106. The network 106 may include, but is not limited to, an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and so forth without limiting the scope of the present disclosure. The artificial intelligence system 100 is preferably realized as a computer-implemented system in that the first and second computing devices (102, 104) are configured as computer-based electronic devices.

Although the first and second computing devices 102, 104 are shown in FIG. 1, an embodiment of the artificial intelligence system 100 may support any number of computing devices. The artificial intelligence system 100 may support only one computing device (102 or 104). The computing devices 102, 104 may include, but are not limited to, a desktop computer, a personal mobile computing device such as a tablet computer, a laptop computer, or a netbook computer, a smartphone, a video game device, a digital media player, a piece of home entertainment equipment, backend servers hosting database and other software, and so forth. Each computing device 102, 104 supported by the artificial intelligence system 100 is realized as a computer-implemented or computer-based device having the hardware or firmware, software, and/or processing logic needed to carry out the intelligent messaging techniques and computer-implemented methodologies described in more detail herein. The first computing device 102 and/or the second computing device 104 may be configured to display features by an artificial intelligence settlement engine 108. The features may be helpful to perform settlements based on an activity, user groups, and set of virtual/physical entities. The first computing device 102 and the second computing device 104 may be operated by one or more users. The users may include, but not limited to, a gamer, a player, a user, a customer, analyst, employee, individual, user, an entity, and so forth. For example, the first computing device 102 captures the transactions between the users and settles the payments. The users may be different or belong to same organization/entity.

The first computing device 102 and/or the second computing device 104 may include the artificial intelligence settlement engine 108, which is accessed as a mobile application, a web application, software that offers the functionality of mobile applications, and viewing/processing of interactive pages, for example, are implemented in the first and second computing devices 102, 104 as will be apparent to one skilled in the relevant arts by reading the disclosure provided herein. The artificial intelligence settlement engine 108 may be downloaded from the cloud server (not shown). For example, the artificial intelligence settlement engine 108 may be any suitable application downloaded from GOOGLE PLAY® (for Google Android devices), Apple Inc.'s APP STORE® (for Apple devices), or any other suitable database. In some embodiments, the artificial intelligence settlement engine 108 maybe software, firmware, or hardware that is integrated into the first and second computing devices 102 and 104. The artificial intelligence settlement engine 108 may be an artificial intelligence powered, need-based, to enable real-time settlements.

The artificial intelligence settlement engine 108 may be configured to enable one or more users to provide one or more predefined activity templates on the first and second computing devices 102 and 104. The predefined activity templates may include, but not limited to, an online poker activity template, and so forth. The artificial intelligence settlement engine 108 may also be configured to customize activity templates fully/partially based on dynamic needs, and then supply to the artificial intelligence settlement engine 108. The artificial intelligence settlement engine 108 may be configured to manage one or more settlement process and/or rules (ex: settle with exact cash-in and cash-out groups, like −2300$, +2300$ etc.) in the settlement process. The artificial intelligence settlement engine 108 may further be configured to integrate partially or fully processed steps and/or rules (from external systems) into settlement process sequence.

The artificial intelligence settlement engine 108 may be configured to map settlement process steps and/or rules with activity templates and notify the success/failure of process steps and/or rules of settlement process to all/required users/entities. The artificial intelligence settlement engine 108 may be configured to map notification process with notification templates and optional mapping with activity templates and also map with process steps and/or rules. The artificial intelligence settlement engine 108 may be configured to customize the process steps and/or rules based on various factors. For example, automatically identify the settlement rules based on primary friends' circle, frequent player list etc. The artificial intelligence settlement engine 108 may further be configured to reuse process steps and/or rules for upcoming activity settlements. The artificial intelligence settlement engine 108 may be configured to provide one or more shortest paths to settle amount between group of users and/or entities using one or more dynamic parameters (for example, settle amount by matching payment gateways, and settle amount for unmatching payment gateways with help of mediators), and/or using one or more process steps and/or rules. The payment gateways may include, but not limited to, a merchant service provided by an e-commerce application service provider, and the like.

Figure 2:
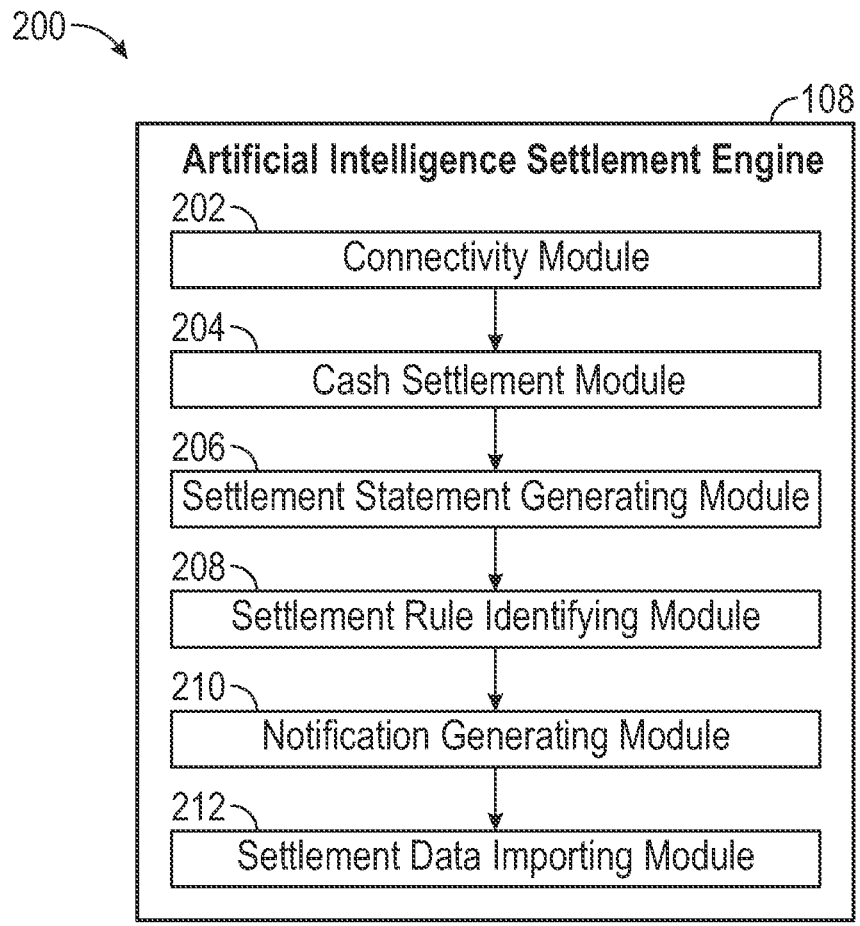
FIG. 2 is a block diagram depicting a schematic representation of an artificial intelligence settlement engine shown in FIG. 1, in accordance with one or more exemplary embodiments.

Referring to FIG. 2 is a block diagram 200 depicting a schematic representation of the artificial intelligence settlement module 108 shown in FIG. 1, in accordance with one or more exemplary embodiments. The artificial intelligence settlement module 108 may include a bus 201, a connectivity module 202, a cash settlement module 204, a settlement statement generating module 206, a settlement rule identifying module 208, a notification generating module 210, and a settlement data importing module 212. The bus 201 may include a path that permits communication among the modules of the artificial intelligence settlement module 108. The term "module" is used broadly herein and refers generally to a program resident in memory of the computing device 102 or 104.

The connectivity module 202 may be configured to establish communication between the first computing device 102 and the second computing device 104. The connectivity module 202 not only establishes communication between the first and second computing devices 102, 104, but also establishes the communication between other devices. The settlement data importing module 212 may be configured to import/export data from an online game in an excel format, and then apply further rules and finally perform settlements on the first computing device 102 or the second computing device 104. The online game may include, but not limited to, a poker game, and the like.

The cash settlement module 204 may be configured to add or manage one or more settlement process steps and/or rules (for example, settle with exact cash-in and cash-out groups, like 2300$, +2300$ etc) in a settlement process on the first computing device 102 and/or the second computing device 104. The settlement statement generating module 206 may be configured to generate settlement statements on the first computing device 102 or the second computing device 104. The settlement rule identifying module 208 may be configured to identify settlement rules based on a primary friend's circle, a frequent player list on the first computing device 102 or the second computing device 104. The notification generating module 210 may be configured to generate one or more notifications on the first computing device 102 and/or the second computing device 104 to the users on pending payments, provides acknowledgements on successful payments. The notifications may include, but not limited to, email notifications, push notifications, and the like.

Figure 3:
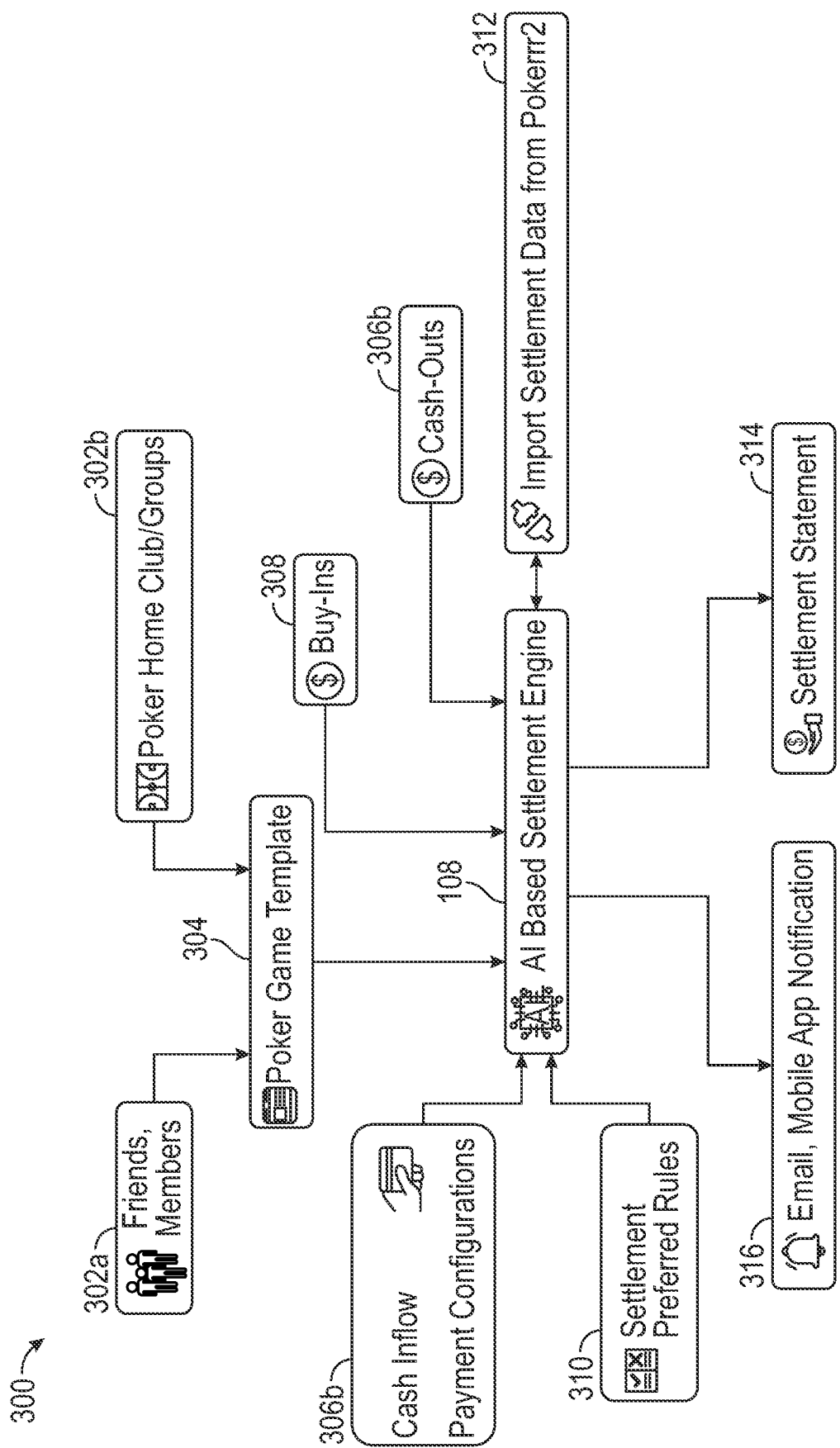
FIG. 3 is an example flow diagram 300 depicting a settlement process performed by the artificial intelligence settlement engine 108, in accordance with one or more exemplary embodiments.

Referring to FIG. 3 is an example flow diagram 300 depicting a settlement process performed by the artificial intelligence settlement engine 108, in accordance with one or more exemplary embodiments. The artificial intelligence settlement engine 108 may be configured to enable the users 302*a*, 302*b* to signing in the game template 304 via the first computing device 102 or the second computing device 104. The users may include, but not limited to, friends, members, poker home club members, groups, colleagues, customers, clients, and the like. The game template may include, but not limited to, a poker game template, live game, and the like.

The artificial intelligence settlement engine 108 may be configured to offer an easy way of on-boarding users into a settlement process on the first computing device 102 or the second computing device 104. The artificial intelligence settlement engine 108 may be configured to manage or add one or more settlement process steps and/or rules like settle with exact cash-in 306a and cash-out groups 306b in the settlement process on the first computing device 102 or the second computing device 104. The artificial intelligence settlement engine 108 may include a flexibility of buy-in configurations 308 based on activity templates, and activity entities on the first computing device 102 or the second computing device 104.

The artificial intelligence settlement engine 108 may be configured to retain previously used configurations and settlement preferred rules 310 for upcoming activity settlements if required. The artificial intelligence settlement engine 108 may be configured to integrate with external services 312 to import/export data in an excel format on the first computing device 102 or the second computing device 104. The artificial intelligence settlement engine 108 may further be configured to provide one or more settlement statements 314 on the first computing device 102 or the second computing device 104. The artificial intelligence settlement engine 108 may be configured to generate one or more notifications 316 on the first computing device 102 and/or the second computing device 104 to the users on pending payments. The notifications may include, but not limited to, email notifications, pop up notifications, alerts, and the like.

Figure 4:
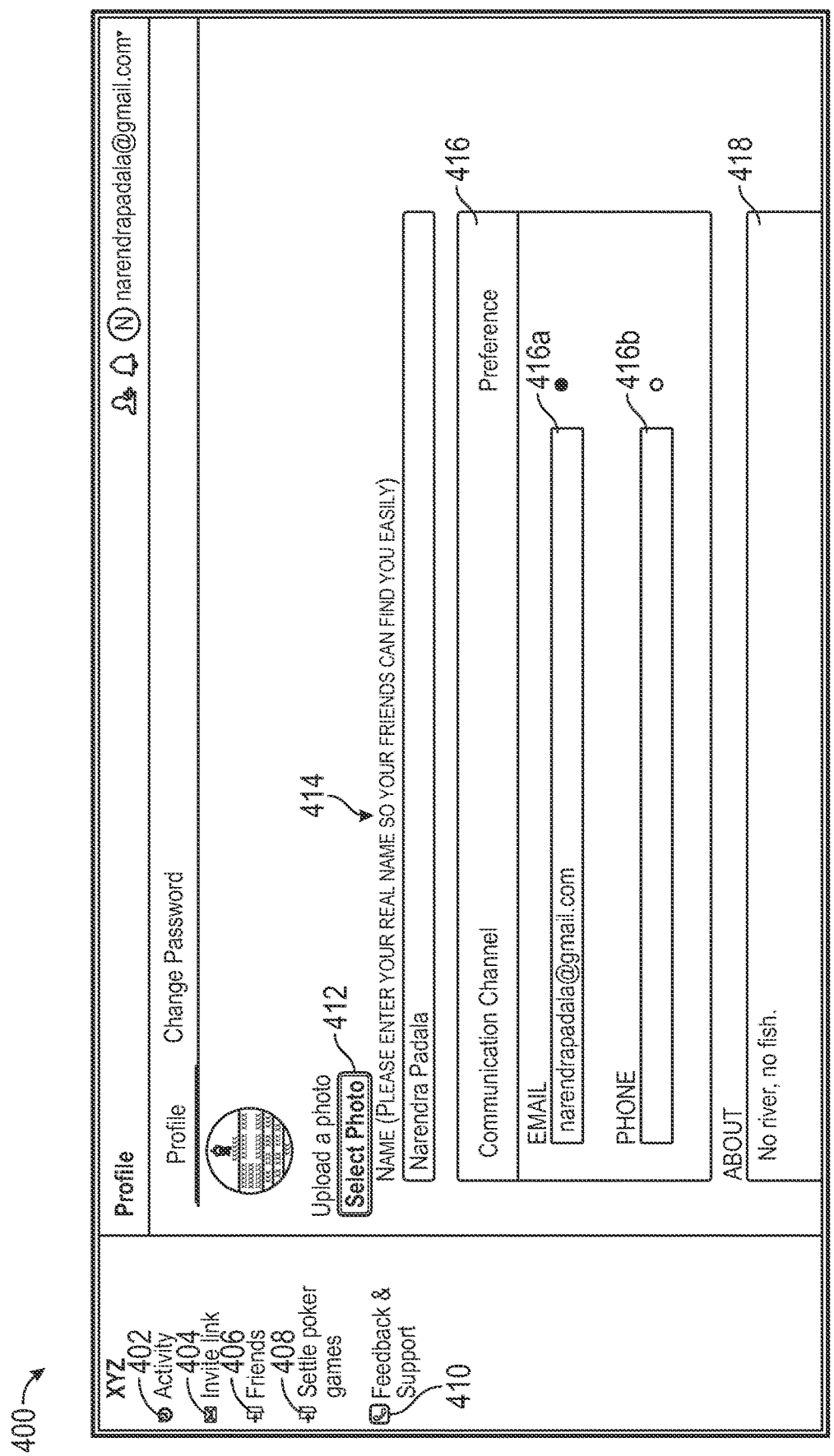
FIG. 4 is an example diagram 400 depicting a user's profile screen, in accordance with one or more exemplary embodiments.

Referring to FIG. 4 is an example diagram 400 depicting a user's profile screen, in accordance with one or more exemplary embodiments. The artificial intelligence settlement engine 108 may be configured to enable the users on the computing devices 102, 104 to login or signup or register by using user's login identity credentials. The login identity credentials may include social media sites' identity credentials. The identity credentials comprise a unique identifier (e.g., a username, an email address, a date of birth, a house address, a mobile number, and the like), and a secured code (e.g., a password, a symmetric encryption key, biometric values, a passphrase, and the like). The user's profile screen 400 includes an activity option 402, an invite link 404, and a friends list 406, settle poker games 408 and a feedback and support option 410.

The activity option 402 may be configured to enable the users to perform activities on the first computing device 102 or the second computing device 104 and that each activity benefit the individual. If the user selects the activity option 402, then total payable amount or total receivable amount for the poker game may appear on the first computing device 102 or the second computing device 104. The activity option 402 may also be configured to provide quick links and also process video or images on the first computing device 102 or the second computing device 104. The quick links may include, but not limited to, add your poker friends link, settle a game played on poker 2, get notified after a settlement, track your poker bankroll, and the like. The invite link 404 may be configured to invite other groups to join alliance, such as by email, clicking on the invite link 404 on the home page, and the like. Upon receiving the invitation link, the recipients or other groups may receive the customized message with the link back to the join page. If the user selects the friends list 406, then the list of friends may appear on the first computing device 102 or the second computing device 104. The settle poker games 408 may be configured to enable the user to select at least one: settle live (in person) game (shown in FIG. 7); settle poker 2 game (shown in FIG. 7A, FIG. 7B); settle all other poker app game (shown in FIG. 7A, FIG. 7B); managed games (shown in FIG. 7A, FIG. 7B); played games (shown in FIG. 7A, FIG. 7B); poker bankroll (shown in FIG. 7A, FIG. 7B); and the like. The poker games may include, but not limited to, draw poker, stud poker, community poker, and the like. The feedback and support option 410 may be configured to enable the users for quantitative and/or qualitative feedback on the first computing device 102 or the second computing device 104 and also configured to provide one or more reminders to the users if the users are unable to process the data. For instance, if the user is in need to perform a particular task like financial transaction, then the feedback and support option helps the user to fulfill his/her need.

The user's profile screen 400 may further include a select option 412, a name option 414, a communicational channel screen 416, and also an about option 418. The select option 412 may be configured to upload an image on the first computing device 102 or the second computing device 104 after selecting the image by the user. The image may include, but not limited to, user's personal photo, user's favorite photo, user's family photo, and the like. The name option 414 may be configured to enable the user to give his original name on the first computing device 102 or the second computing device 104.

The communication channel screen 416 may include an email option 416a and a phone number option 416b. The communication channel screen 416 may be configured to allow the user to give their preference either the email option 416a or the phone number option 416b on the first computing device 102 or the second computing device 104. The email option 416a and the phone number option 416b may be configured to enable the user to provide an email identity and a phone number on the first computing device 102 or the second computing device 104. The about option 418 may be configured to enable the user to describe few details about their interests or any other subject matter on the first computing device 102 or the second computing device 104.

Figure 5:
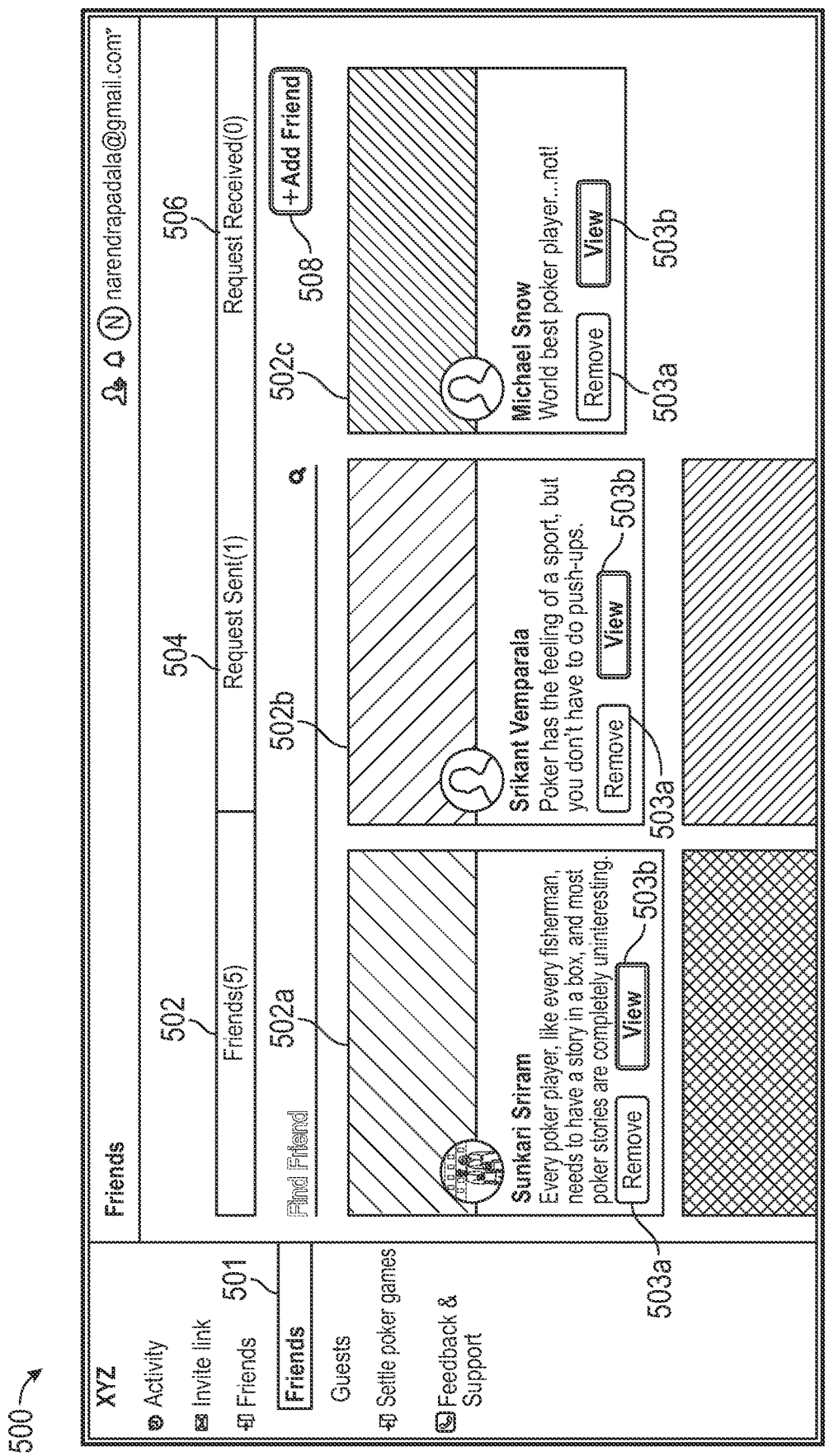
FIG. 5 is an example diagram 500 depicting a friend's screen, in accordance with one or more exemplary embodiments.

Referring to FIG. 5 is an example diagram 500 depicting the friend's screen, in accordance with one or more exemplary embodiments. The friends screen 500 may include a friends' option 501 configured to display the friend's screen on the first computing device 102 or second computing device 104. The friends screen 500 includes a list of friends 502, a request sent option 504, a request received option 506, and an add friend option 508. If the user selects the list of friends 502, then the number of friends' profiles 502a, 502b, and 502c may be displayed on the first computing device 102 or the second computing device 104. Each friend profile 502a or 502b or 502c may include a remove option 503a and a view option 503b. If the user selects the remove option 503a, then that friend profile 502a or 502b or 502c may be removed from the friend screen 500 on the first computing device 102 or the second computing device 104. If the user selects the view option 503b, then that friend profile 502a or 502b or 502c may be clearly displayed on the first computing device 102 or the second computing device 104. The request sent option 504 may be configured to provide the total number of requests sent to other users on the first computing device 102 or the second computing device 104. The request received option 506 may be configured to provide the total number of requests received from other users on the first computing device 102 or the second computing device 104.

Referring to FIG. 6 is an example diagram 600 depicting the guest screen, in accordance with one or more exemplary embodiments. The guest screen 600 includes a guest's option configured to display the guest screen on the first computing device 102 or second computing device 104. The guest screen 600 includes an edit option 602, and a delete option 604, and a create guest option 606. The create guest option 606 may be configured to create one or more guests on the first computing device 102 or the second computing device 104. The edit option 602 may be configured to enable the user to edit the one or more guest names on the first computing device 102 or the second computing device 104. The delete option 604 may be configured to enable the user to delete the guest names on the first computing device 102 or the second computing device 104. The guest screen 600 further includes guests' email identities and also created dates on the first computing device 102 or the second computing device 104.

Figure 7A:
FIG. 7A is an example diagram 700a depicting live game screen, in accordance with one or more exemplary embodiments.

Referring to FIG. 7A is an example diagram 700a depicting live game screen, in accordance with one or more exemplary embodiments. The live game screen 700a includes settle live (in person) game option 702. If the user selects the settle live (in person) game option 702, the live game screen 700 may be displayed on the first computing device 102 or the second computing device 104. The live game screen 700 includes an add friend option 704, an add option 706, an email preview option 708, and a settle option 710. The add friend option 704 may be configured to enable the user to add friends on the first computing device 102 or the second computing device 104. An email address bar 712 may be configured to allow the user to provide an email address on the first computing device 102 or the second computing device 104 and then the user may select the add option 706. The email preview option 708 may be configured to allow the user to see how settlement email looks on the first computing device 102 or the second computing device 104. The settle option 710 may be configured to allow the user to settle the amount.

Figure 7B:
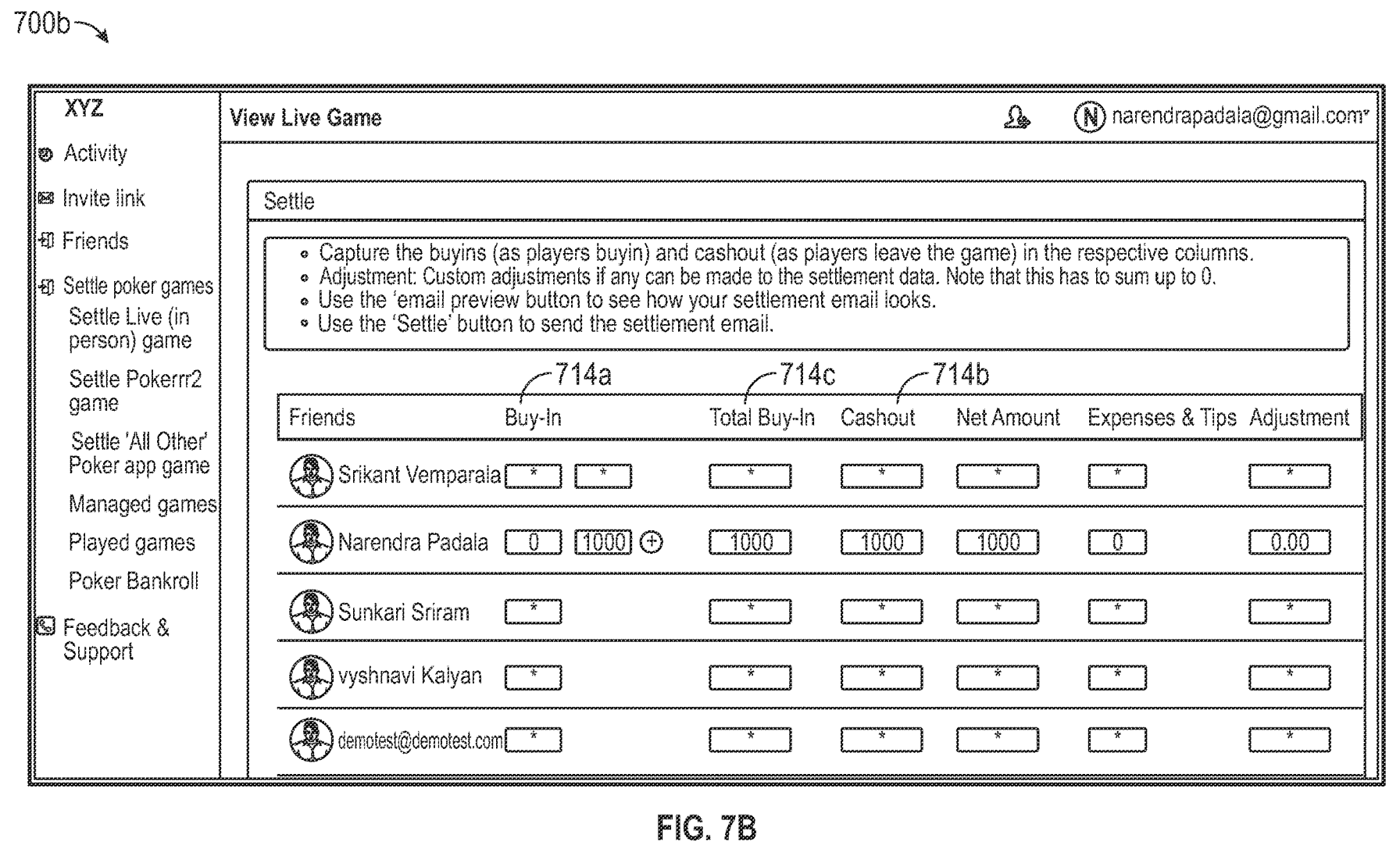

Referring to FIG. 7B is another example diagram 700b depicting a view live game screen, in accordance with one or more exemplary embodiments. If the user further selects the settle live (in person) game option 702, the live game screen 700b may be displayed on the first computing device 102 or the second computing device 104. The view live game screen 700b includes buy-ins 714a, cash out 714b, and total buy-in 714c. The buy-ins 714a as players buy in and cash out 714b as players leave the game in the respective columns. The total buy-in 714c may include total buy-in amount. The view live game screen 700b further includes net amount and expenses and tips, and adjustments. The user may make custom adjustments to the settlement data. The custom adjustments may be sum up to zero.

Figure 8A:
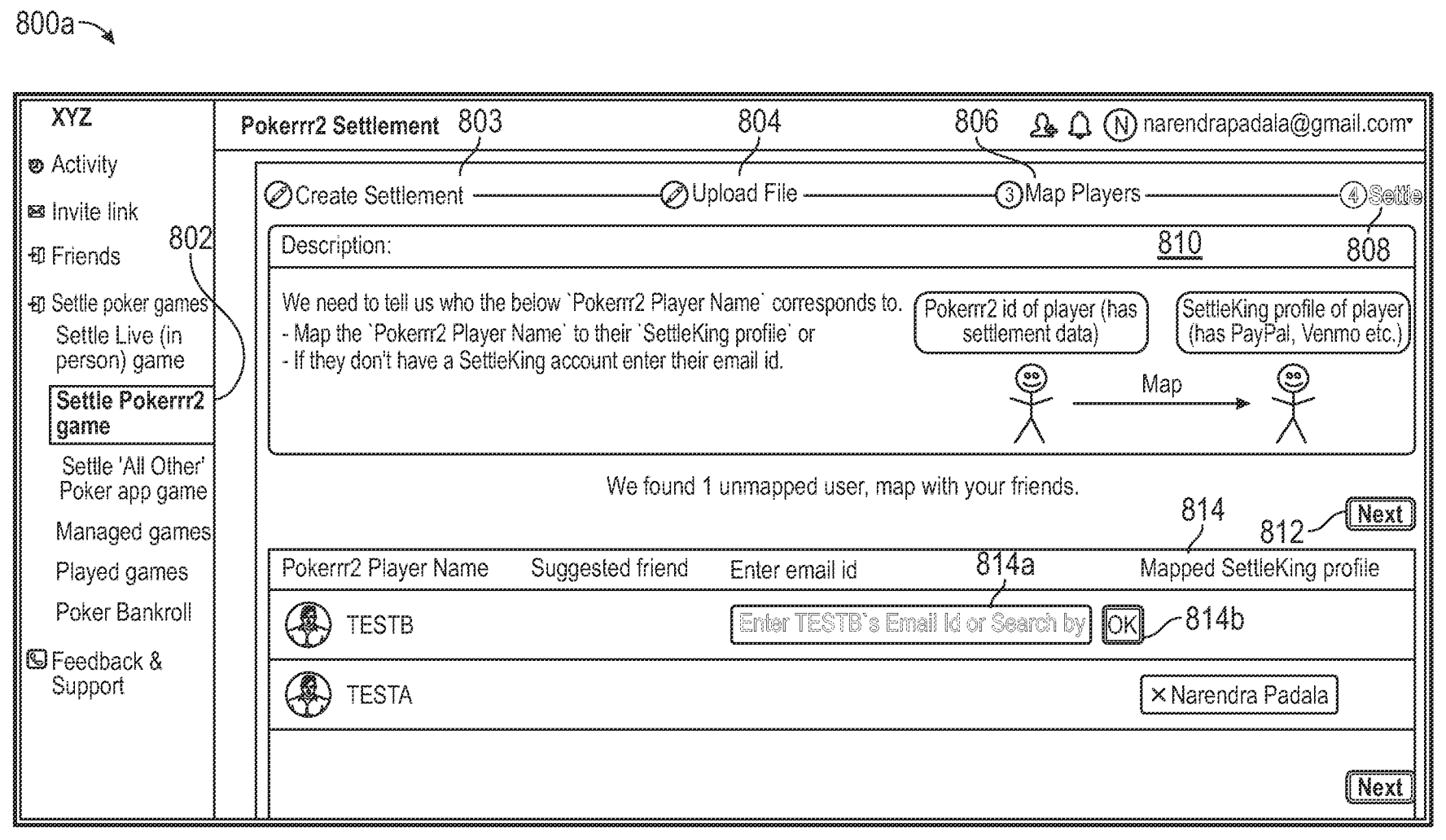
Figure 8C:
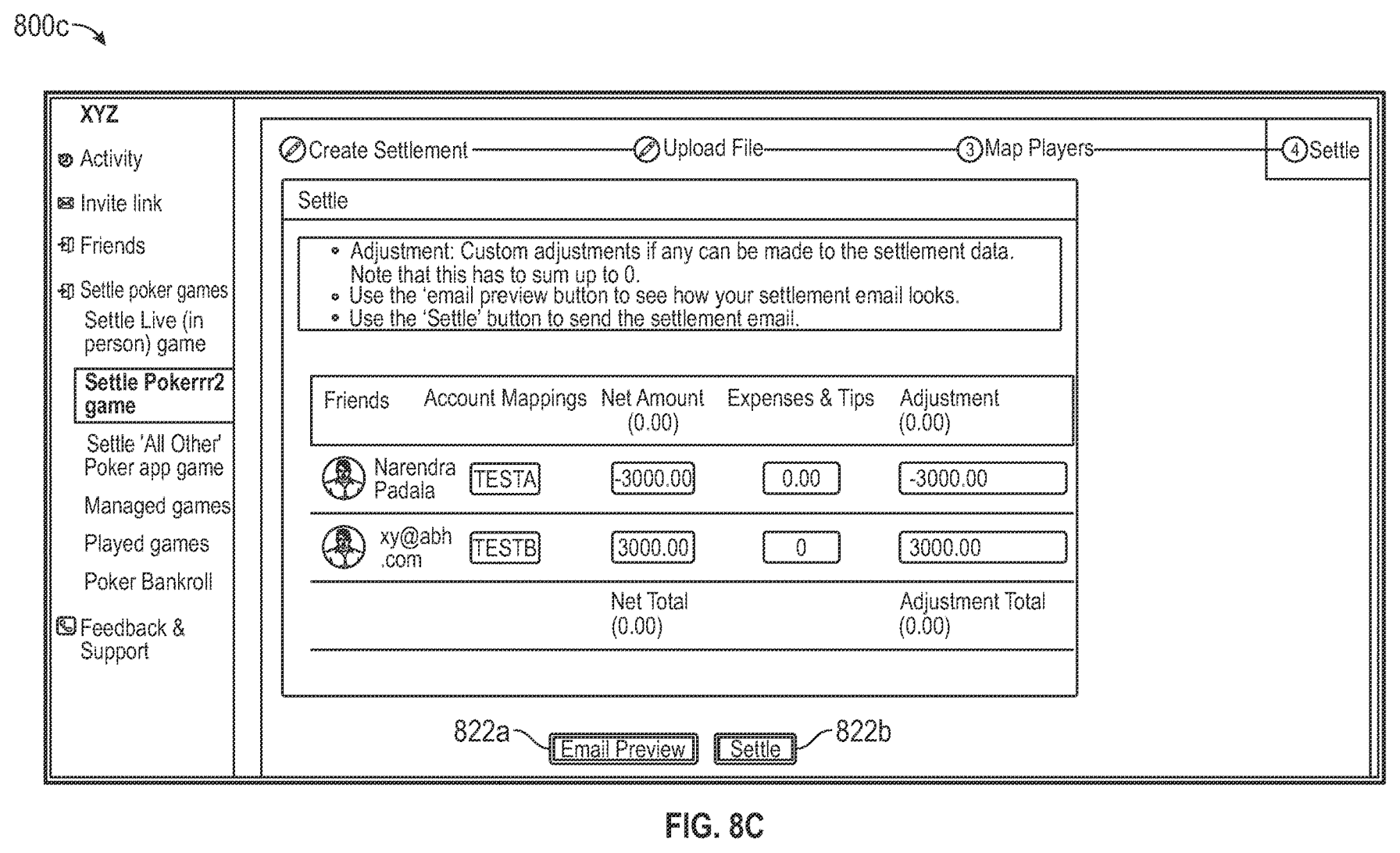

Referring to FIG. 8A, FIG. 8B, FIG. 8C are example diagrams 800a, 800b, 800c depicting the poker settlement screens, in accordance with one or more exemplary embodiments. If the user selects a poker 2 game option 802, then the poker settlement screen 800 may be displayed on the first computing device 102 or the second computing device 104. The poker settlement screen 800 includes a create settlement option 803, an upload file option 804, a map players option 806, and a settle option 808. The poker settlement screen 800 includes a description screen 810, a next option 812, and a mapped user's screen 814. The mapped user's screen 814 includes an email address bar 814a, and an OK option 814b. The create settlement option 803 may be configured to create settlements on the first computing device 102 or the second computing device 104. The upload file option 804 may be configured to upload one or more files from the first computing device 102 or the second computing device 104 once the user selects the one or more files. The map players option 806 may be configured to map the poker 2 player name to the artificial intelligence settlement engine's profile or if the one or more players don't have artificial intelligence settlement engine's account enter the player's email identity.

The description screen 810 may be configured to provide the poker game details on the first computing device 102 or the second computing device 104. The next option 812 may be configured to enable the user to change from one option to other option. The email address bar 814a may be configured to allow the user to provide an email address on the first computing device 102 or the second computing device 104 to search other users. The OK option 814b may be configured allow the user to select it after the providing the email address.

Referring to FIG. 8B is another example diagram 800b depicting another embodiment of the settlement screen. The settlement screen 800b includes a host screen 816, a rules screen 818, and an expenses screen 820. The host screen 816 may include a select host option 816a. The select host option 816a may be configured to enable the user to select at least one host from the list of hosts on the first computing device 102 or the second computing device 104. The host screen 816 may be configured to send settlement email on behalf of the host. The host screen 816 may also provide poker 2 tips, expenses to the host. The rules screen 818 may include a YES option 818a, a NO option 818b, a select payer option 818c, a select payee option 818d, an assign option 818e, and do not assign option 818f, and an add option 818g. The YES option 818a may be configured to enable the user to route all payments through the host on the first computing device 102 or the second computing device 104. For example, the selected host will receive money from all players that owe money and will send money to all players. The NO option 818b may be configured to enable the user not to route the payments through the host on the first computing device 102 or the second computing device 104. The select payer option 818c may be configured to enable the user to select the payer from the list of payers on the first computing device 102 or the second computing device 104. The select payee option 818d may be configured to enable the user to select the payee from the list of payees on the first computing device 102 or the second computing device 104. The assign option 818e may be configured to enable the user to assign at least one: payee; and payer on the first computing device 102 or the second computing device 104 and then select the add option 818g on the first computing device 102 or the second computing device 104. The expenses screen 820 includes a winner option 820a and all players' option 820b. The expenses screen 820 may provide dinner expenses or poker gold coin expenses to share with players. If the user selects the winner option 820a or the players option 820b, then number of expenses may provide on the first computing device 102 or the second computing device 104.

Referring to FIG. 8C is an example diagram 800c depicting another embodiment of the settlement screen. The settlement screen 800c may provide custom adjustments if any can be made to the settlement data. The custom adjustments may have to sum up to zero. The settlement screen 800c includes email preview button 822a and a settle button 822b. The email preview button 822a may be configured to allow the user to see how settlement email looks on the first computing device 102 or the second computing device 104. The settlement email button 822b may be configured to send the settlement email.

Referring to FIG. 9 is an example diagram 900 depicting other poker apps screen, in accordance with one or more exemplary embodiments. If the user selects the settle all other poker app game option 902, then the poker app screen 900 may appear on the first computing device 102 or second computing device 104. The poker app screen 900 includes the add friends' option 904a, an email bar 904b, and an add option 904c. The add friends' option 904a may be configured to enable the users to add players from the friends list that played the game you are trying to settle. If the player is not on the artificial intelligence settlement engine 108, then the user may give email id on the email bar 904b and then select the add option 904c. The other app screen 900 includes net amount won or lost by the player in the net amount column.

In accordance with one or more exemplary embodiments, the artificial intelligence settlement engine 108 may be configured to provide managed games 906 and played games 908 on the first computing device 102 or the second computing device 104. The managed games 906 may include list of games i.e., added games. The played games 908 may include the list of played games. The user may view action of each played game on the first computing device 102 or the second computing device 104.

Referring to FIG. 10 is an example diagram 1000 depicting a poker bankroll screen, in accordance with one or more exemplary embodiments. If the user selects the poker bank roll option 1002, then the poker bank roll screen 1000 may be displayed on the first computing device 102 or the second computing device 104. The poker bank roll screen 1000 includes a note screen 1003, and a date range screen 1004. The note screen 1003 may provide toggle, when set to ON, the user may able to track bankroll from games settled via the artificial intelligence settlement engine 108 over time. When set to OFF, the user may not be able to track poker bankroll on the artificial intelligence settlement engine 108.

The date range screen 1004 may include a date range option 1004a, a search option 1004b, a cancel option 1004c, and an add transaction option 1004d. The date range option 1004a may be configured to enable the user to select the date range and then select the search option 1004b on the first computing device 102 or the second computing device 104. The cancel option 1004c may be configured to enable the user to cancel the selected date range. If the user wants add transaction, then the user has to select the add transaction option 1004d on the first computing device 102 and the second computing device 104.

Figure 11:
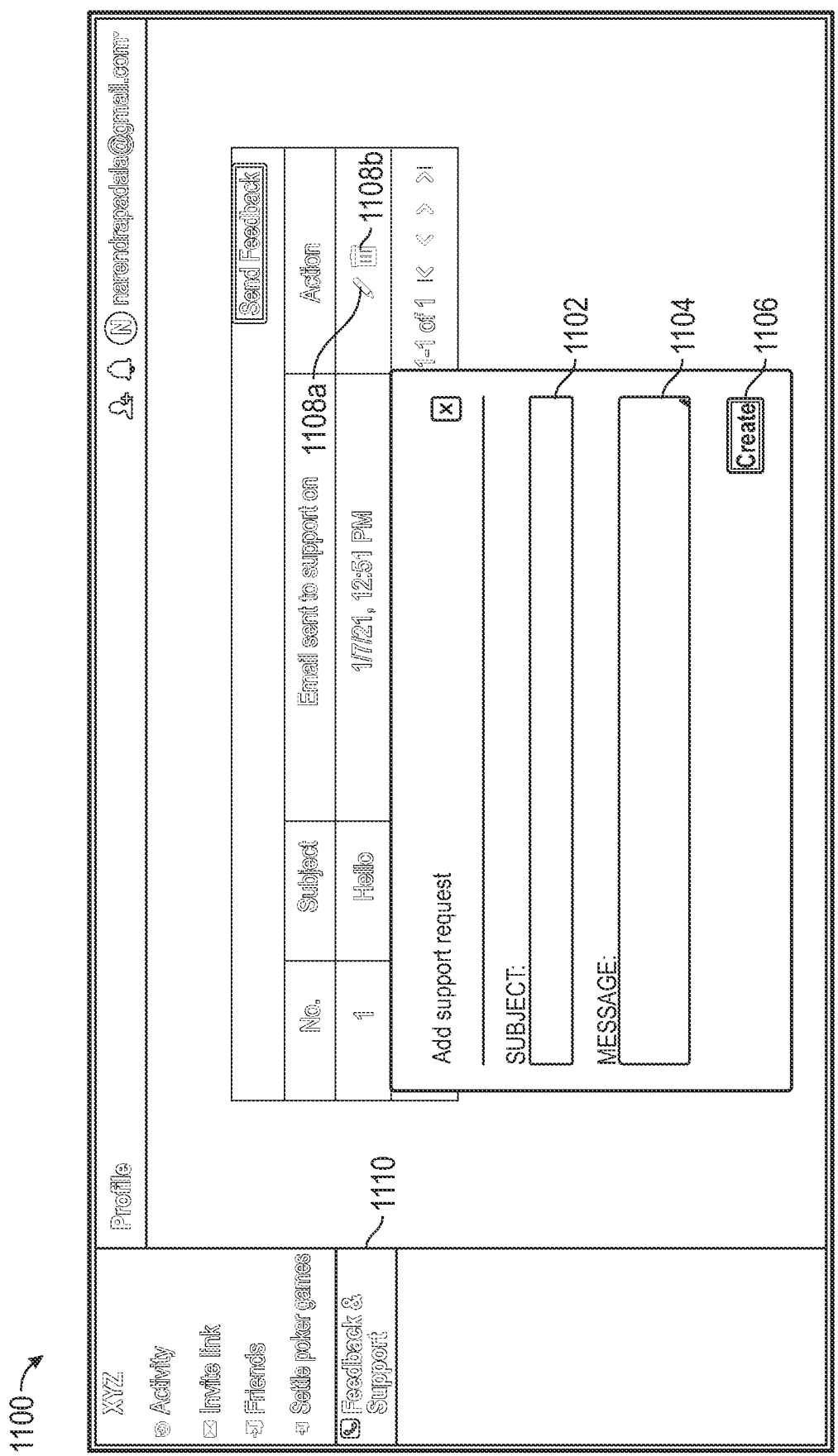
FIG. 11 is an example diagram 1100 depicting a feedback and support screen, in accordance with exemplary embodiments.

Referring to FIG. 11 is an example diagram 1100 depicting a feedback and support screen, in accordance with exemplary embodiments. If the user selects the feedback and support option 1110, then the feedback and support screen 1100 may be displayed on the first computing device 102 or the second computing device 104. The feedback and support screen 1100 includes a subject option 1102, a message option 1104, and a create option 1106. If the user wants to add a support request, the subject name and the message may be given on the subject option 1102 and the message option 1104. The create option 1106 may be configured to allow the user to create the support request on the first computing device 102 or the second computing device 104. The feedback and support screen 1100 may include an edit option 1108a and also a delete option 1108b. The edit option 1108a may be configured to enable the user to edit the created support request on the first computing device 102 or the second computing device 104. The delete option 1108b may be configured to enable the user to delete the created support request on the first computing device 102 or the second computing device 104.

Figure 12:
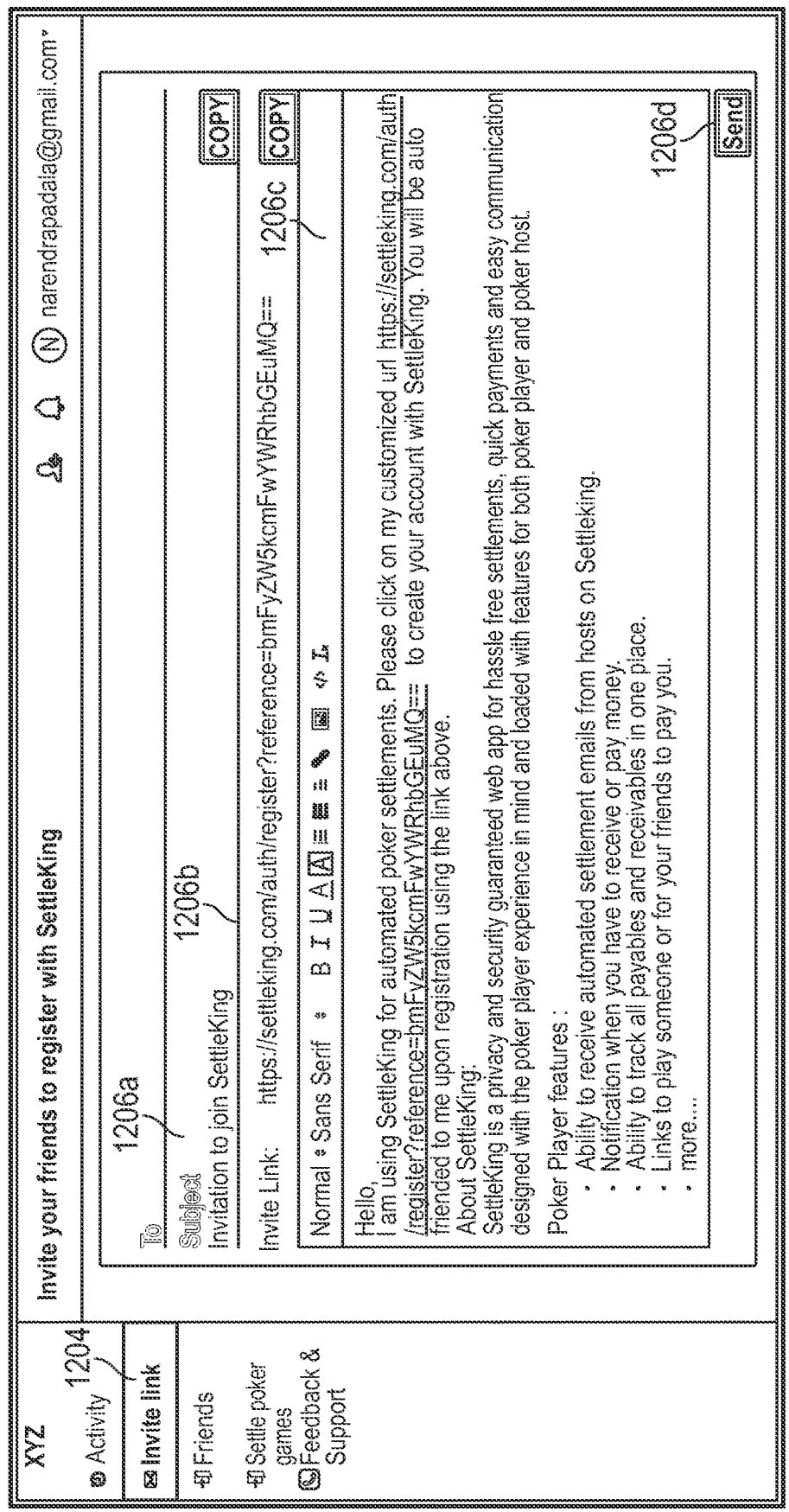
FIG. 12 is an example diagram 1200 depicting invite link screen, in accordance with one or more exemplary embodiments.

Referring to FIG. 12 is an example diagram 1200 depicting an invite link screen, in accordance with one or more exemplary embodiments. If the user selects the invite link option 1204, then the invite link screen 1200 may be displayed on the first computing device 102 or the second computing device 104. The invite link screen 1200 includes to option 1206a, a subject option 1206b, body 1206c, and a send option 1206d. The to option 1206a may be configured to allow the user to give recipients identities. The subject option 1206b may be configured to allow the user to give subject of the context. The subject of the context may include invitation to join the artificial intelligence settlement engine 108. The subject option 1206b may also be configured to allow the user to provide invite link. The body 1206c may include url details, poker settlements, poker player features, and the like.

Figure 13:
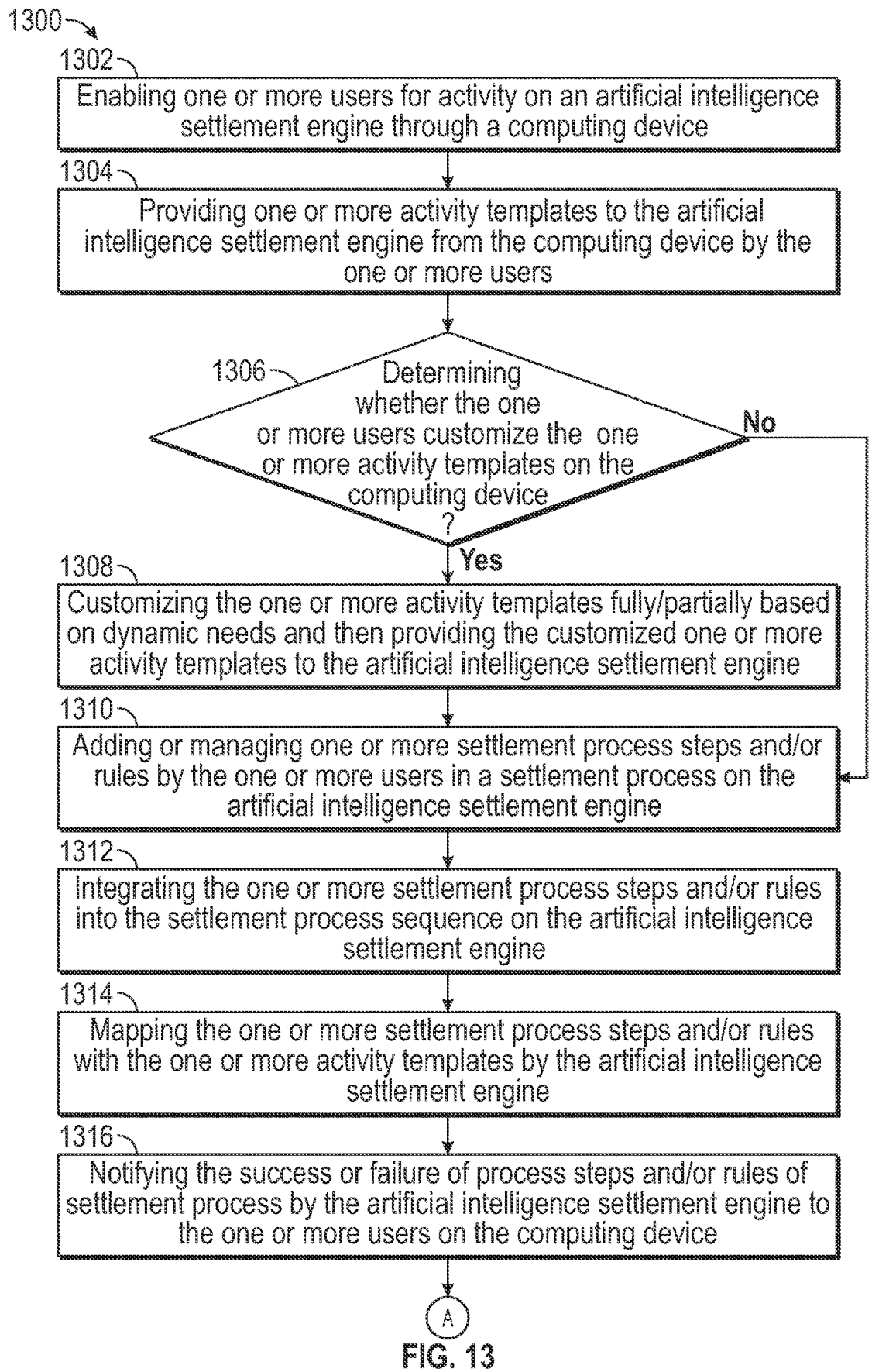
FIG. 13 is an example flow diagram 1300 depicting a method for performing settlements based on activity of users, in accordance with one or more exemplary embodiments.
Figure 13:
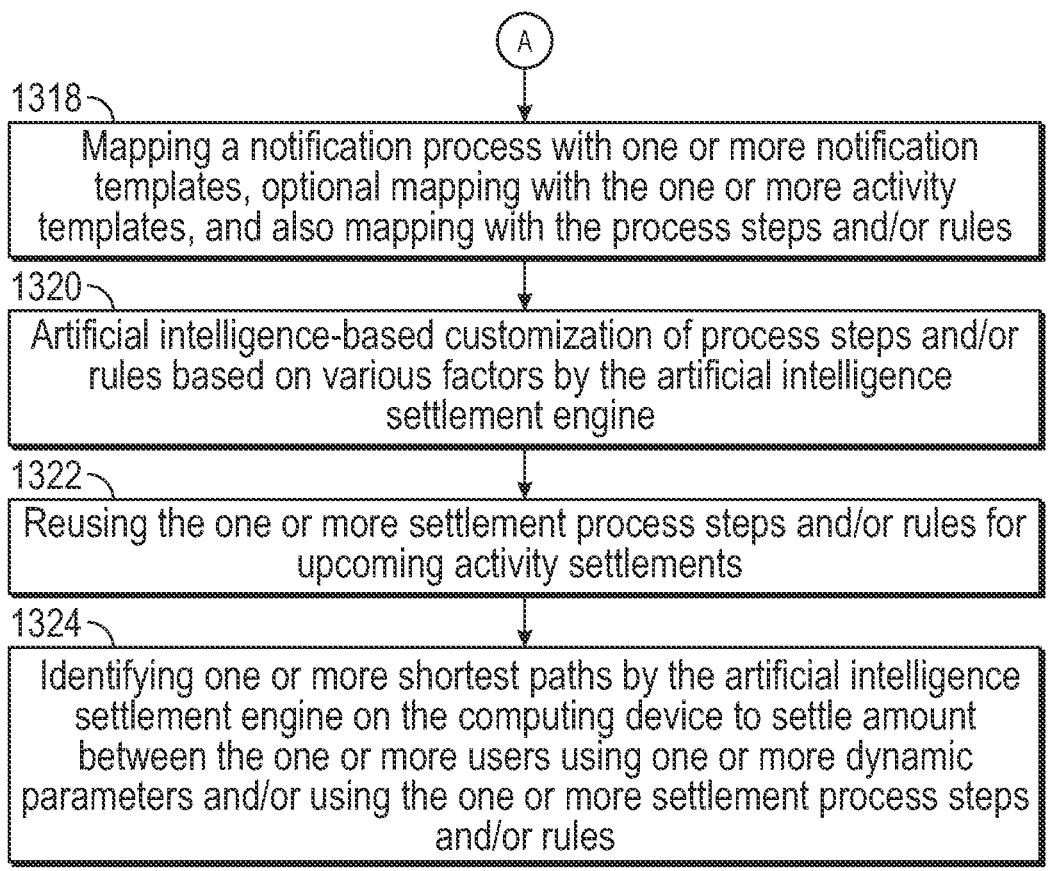

Referring to FIG. 13 is an example flow diagram 1300 depicting a method for performing settlements based on activity of users, in accordance with one or more exemplary embodiments. The method 1300 may be carried out in the context of the details of FIG. 1, FIG. 2, FIG. 3, FIG. 4, and FIG. 5, FIG. 6, FIG. 7A, FIG. 7B, FIG. 8A, FIG. 8B, FIG. 8C, FIG. 9, FIG. 10, FIG. 11, and FIG. 12. However, the method 1300 may also be carried out in any desired environment. Further, the aforementioned definitions may equally apply to the description below.

The method commences at step 1302, enabling the one or more users for activity on the artificial intelligence settlement engine through the computing device. Thereafter, at step 1304, Providing one or more activity templates to the artificial intelligence settlement engine from the computing device by the one or more users. Thereafter, at step 1306, determining whether the one or more users customize the one or more activity templates on the computing device? If answer to step 1306 is YES, then the exemplary method continues at step 1308, customizing the one or more activity templates fully/partially based on dynamic needs and then providing the customized one or more activity templates to the artificial intelligence settlement engine. Thereafter, at step 1310, adding or managing one or more settlement process steps and/or rules by the one or more users in a settlement process on the artificial intelligence settlement engine. Thereafter, at step 1312, integrating the one or more settlement process steps and/or rules into the settlement process sequence on the artificial intelligence settlement engine.

Thereafter, at step 1314, mapping the one or more settlement process steps and/or rules with the one or more activity templates by the artificial intelligence settlement engine. Thereafter, at step 1316, notifying the success or failure of process steps and/or rules of settlement process by the artificial intelligence settlement engine to the one or more users on the computing device. Thereafter, at step 1318, mapping a notification process with one or more notification templates, optional mapping with the one or more activity templates, and also mapping with the process steps and/or rules. Thereafter, at step 1320, artificial intelligence-based customization of process steps and/or rules based on various factors by the artificial intelligence settlement engine. Thereafter, at step 1322, reusing the one or more settlement process steps and/or rules for upcoming activity settlements. Thereafter, at step 1324, identifying one or more shortest paths by the artificial intelligence settlement engine on the computing device to settle amount between the one or more users using one or more dynamic parameters and/or using the one or more settlement process steps and/or rules. If answer to the step 1306 is NO, then the exemplary method continues at step 1310.

Figure 14:
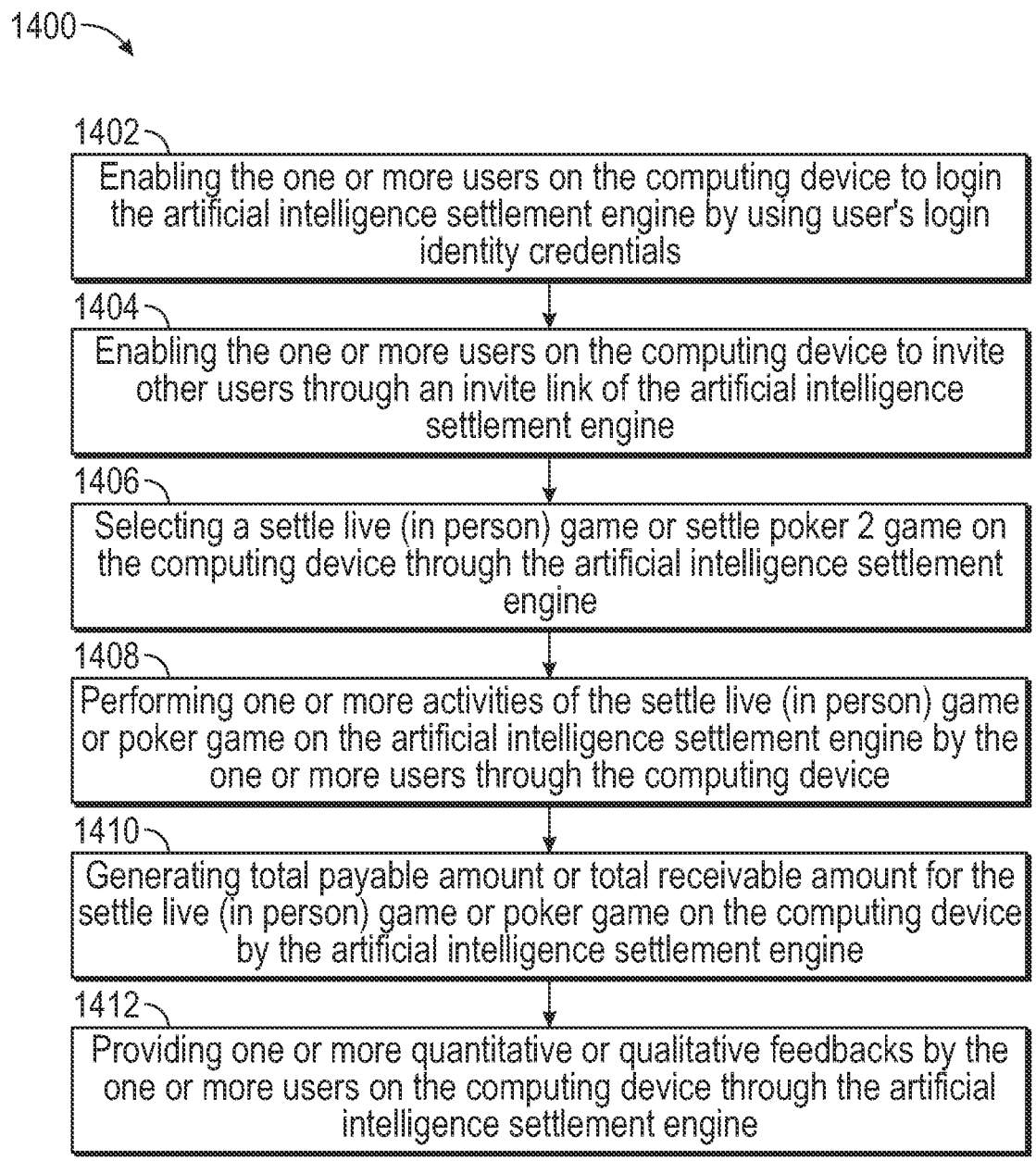
FIG. 14 is an example flow diagram 1400 depicting a method for generating total payable amount or total receivable amount for the settle live (in person) game or poker game, in accordance with one or more exemplary embodiments.

Referring to FIG. 14 is an example flow diagram 1400 depicting a method for generating total payable amount or total receivable amount for the settle live (in person) game or poker game, in accordance with one or more exemplary embodiments. The method 1400 may be carried out in the context of the details of FIG. 1, FIG. 2, FIG. 3, FIG. 4, and FIG. 5, FIG. 6, FIG. 7A, FIG. 7B, FIG. 8A, FIG. 8B, FIG. 8C, FIG. 9, FIG. 10, FIG. 11, FIG. 12, and FIG. 13. However, the method 1400 may also be carried out in any desired environment. Further, the aforementioned definitions may equally apply to the description below.

The method commences at step 1402, enabling the one or more users on the computing device to login the artificial intelligence settlement engine by using user's login identity credentials. Thereafter, at step 1404, enabling the one or more users on the computing device to invite other users through an invite link of the artificial intelligence settlement engine. Thereafter, at step 1406, selecting a settle live (in person) game or settle poker 2 game on the computing device through the artificial intelligence settlement engine. Thereafter, at step 1408, performing one or more activities of the settle live (in person) game or poker game on the artificial intelligence settlement engine by the one or more users through the computing device. Thereafter, at step 1410, generating total payable amount or total receivable amount for the settle live (in person) game or poker game on the computing device by the artificial intelligence settlement engine. Thereafter, at step 1412, providing one or more quantitative or qualitative feedbacks by the one or more users on the computing device through the artificial intelligence settlement engine.

Figure 15:
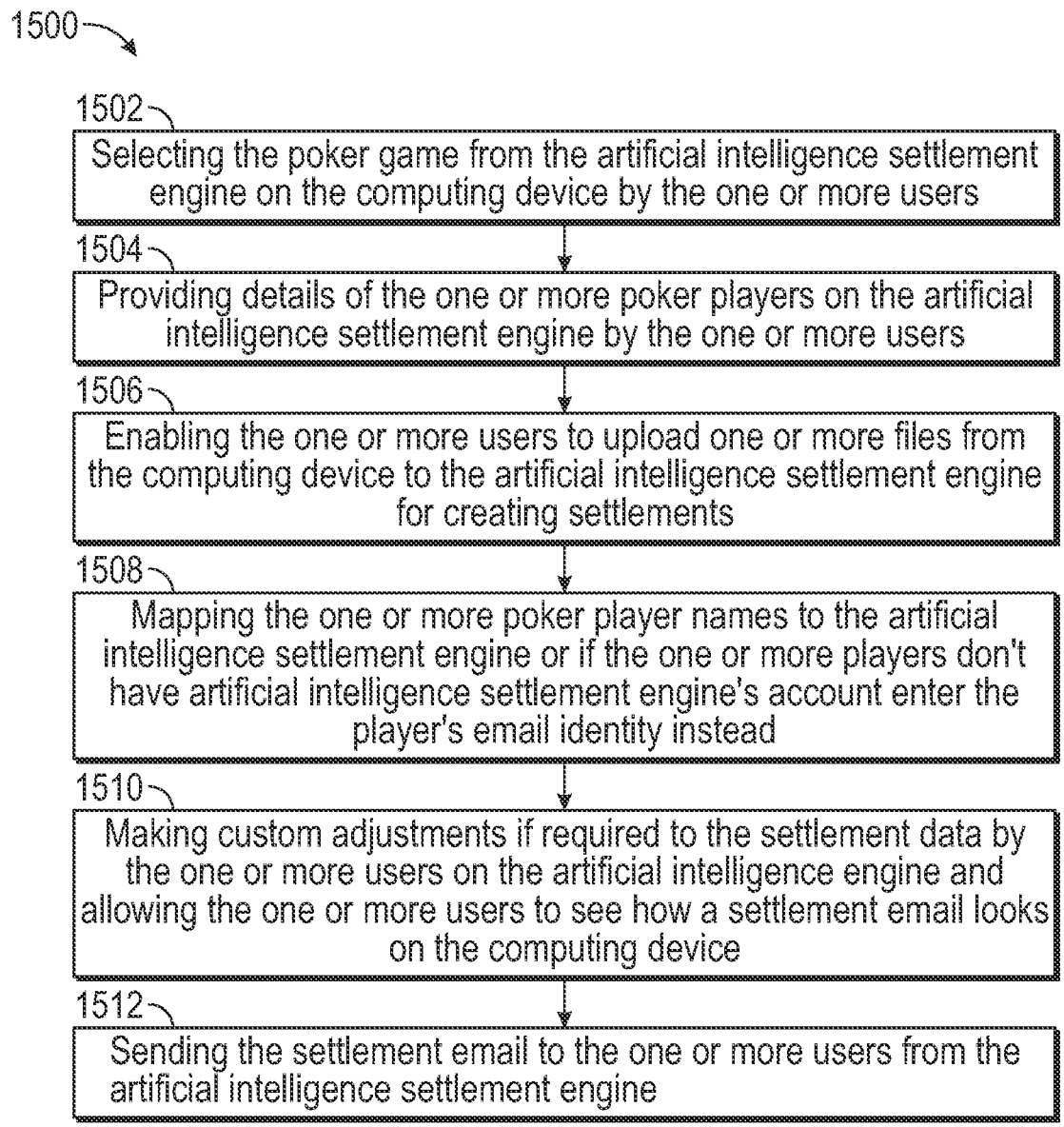
FIG. 15 is an example flow diagram 1500 depicting a method for sending the settlement email to the one or more users from the artificial intelligence settlement engine, in accordance with one or more exemplary embodiments.

Referring to FIG. 15 is an example flow diagram 1500 depicting a method for sending the settlement email to the one or more users from the artificial intelligence settlement engine, in accordance with one or more exemplary embodiments. The method 1500 may be carried out in the context of the details of FIG. 1, FIG. 2, FIG. 3, FIG. 4, and FIG. 5, FIG. 6, FIG. 7A, FIG. 7B, FIG. 8A, FIG. 8B, FIG. 8C, FIG. 9, FIG. 10, FIG. 11, FIG. 12, FIG. 13, and FIG. 14. However, the method 1500 may also be carried out in any desired environment. Further, the aforementioned definitions may equally apply to the description below.

The method commences at step 1502, selecting the poker game from the artificial intelligence settlement engine on the computing device by the one or more users. Thereafter, at step 1504, Providing details of the one or more poker players on the artificial intelligence settlement engine by the one or more users. Thereafter, at step 1506, enabling the one or more users to upload one or more files from the computing device to the artificial intelligence settlement engine for creating settlements. Thereafter, at step 1508, mapping the one or more poker player names to the artificial intelligence settlement engine or if the one or more players don't have artificial intelligence settlement engine's account enter the player's email identity instead. Thereafter, at step 1510, making custom adjustments if required to the settlement data by the one or more users on the artificial intelligence engine and allowing the one or more users to see how a settlement email looks on the computing device. Thereafter, at step 1512, sending the settlement email to the one or more users from the artificial intelligence settlement engine.

Figure 16:
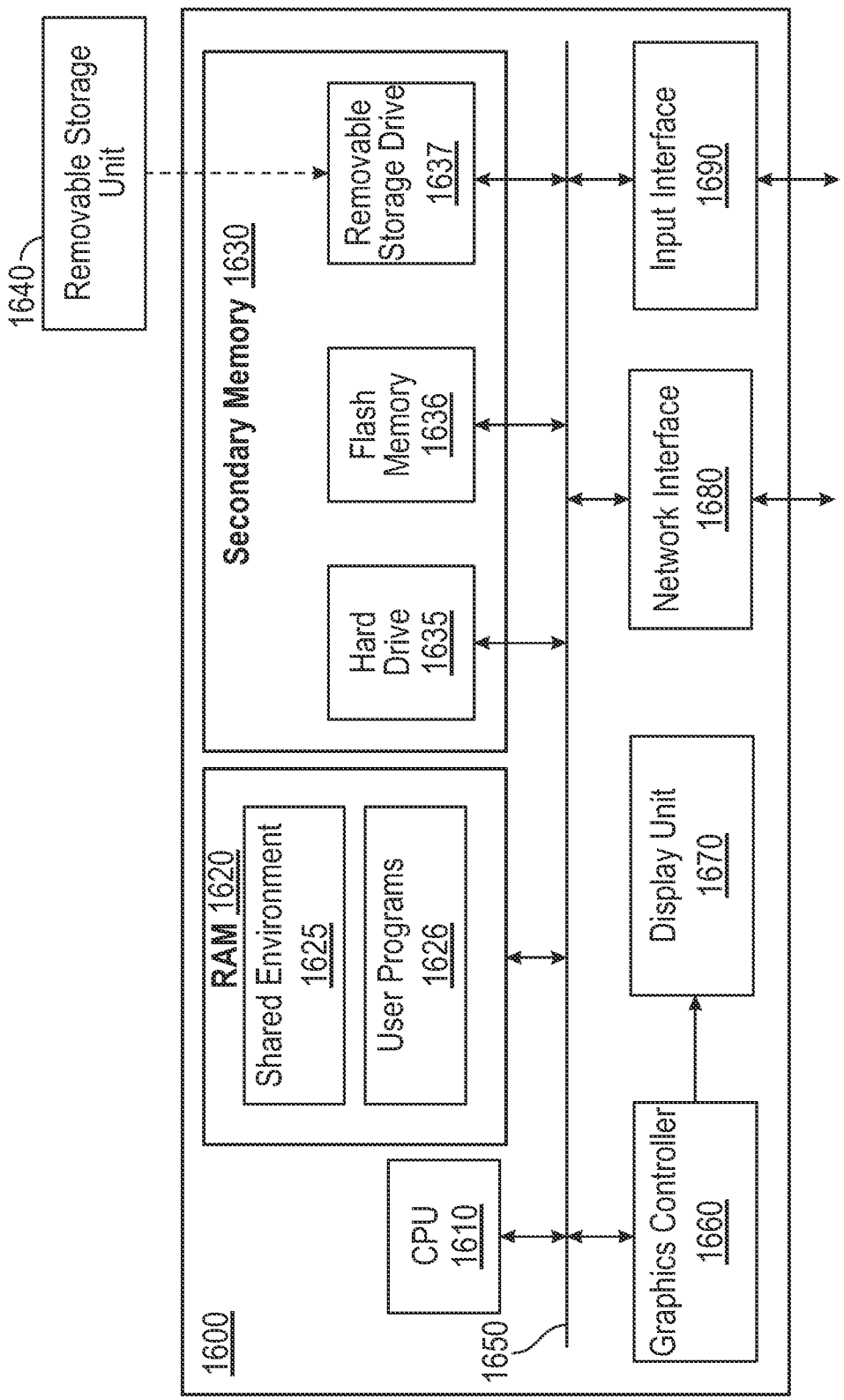
FIG. 16 is a block diagram illustrating the details of digital processing system 1600 in which various aspects of the present disclosure are operative by execution of appropriate software instructions.

Referring to FIG. 16 is a block diagram illustrating the details of digital processing system 1600 in which various aspects of the present disclosure are operative by execution of appropriate software instructions. Digital processing system 1600 may correspond to the first computing device 102 and the second computing device 104 (or any other system in which the various features disclosed above can be implemented).

Digital processing system 1600 may contain one or more processors such as a central processing unit (CPU) 1610, random access memory (RAM) 1620, secondary memory 1627, graphics controller 1660, display unit 1670, network interface 1680, an input interface 1690. All the components except display unit 1670 may communicate with each other over communication path 1650, which may contain several buses as is well known in the relevant arts. The components of FIG. 16 are described below in further detail.

CPU 1610 may execute instructions stored in RAM 1620 to provide several features of the present disclosure. CPU 1610 may contain multiple processing units, with each processing unit potentially being designed for a specific task. Alternatively, CPU 1610 may contain only a single general-purpose processing unit.

RAM 1620 may receive instructions from secondary memory 1630 using communication path 1650. RAM 1620 is shown currently containing software instructions, such as those used in threads and stacks, constituting shared environment 1625 and/or user programs 1626. Shared environment 1625 includes operating systems, device drivers, virtual machines, etc., which provide a (common) run time environment for execution of user programs 1626.

Graphics controller 1660 generates display signals (e.g., in RGB format) to display unit 1670 based on data/instructions received from CPU 1610. Display unit 1670 contains a display screen to display the images defined by the display signals. Input interface 1690 may correspond to a keyboard and a pointing device (e.g., touch-pad, mouse) and may be used to provide inputs. Network interface 1680 provides connectivity to a network (e.g., using Internet Protocol), and may be used to communicate with other systems (such as those shown in FIG. 1, network 106) connected to the network.

Secondary memory 1630 may contain hard drive 1635, flash memory 1636, and removable storage drive 1637. Secondary memory 1630 may store the data software instructions (e.g., for performing the actions noted above with respect to the Figures), which enable digital processing system 1600 to provide several features in accordance with the present disclosure.

Some or all of the data and instructions may be provided on the removable storage unit 1640, and the data and instructions may be read and provided by removable storage drive 1637 to CPU 1610. Floppy drive, magnetic tape drive, CD-ROM drive, DVD Drive, Flash memory, a removable memory chip (PCMCIA Card, EEPROM) are examples of such removable storage drive 1637.

The removable storage unit 1640 may be implemented using medium and storage format compatible with removable storage drive 1637 such that removable storage drive 1637 can read the data and instructions. Thus, removable storage unit 1640 includes a computer readable (storage) medium having stored therein computer software and/or data. However, the computer (or machine, in general) readable medium can be in other forms (e.g., non-removable, random access, etc.).

In this document, the term "computer program product" is used to generally refer to the removable storage unit 1640 or hard disk installed in hard drive 1635. These computer program products are means for providing software to digital processing system 1600. CPU 1610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1630. Volatile media includes dynamic memory, such as RAM 1620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1650. Transmission media can also take the form of acoustic or light waves, such as those generated during radio-wave and infra-red data communications.

In accordance with an exemplary embodiment of the present disclosure, a method for performing settlements based on one or more game activities of one or more users, comprising: enabling the one or more users on the artificial intelligence settlement engine 108 to provide one or more predefined activity templates and managing one or more settlement rules in the artificial intelligence settlement engine 108 from a computing device 102/104. The settlement rules may include exact cash-in and cash-out groups, like 2300$, +2300$, and the like. The one or more settlement rules may include, but not limited to, the one or more users make payments, the one or more users receive payments, the one or more users restrict to make payments, the one or more users restrict to receive payments, and the like. For example: a) a user A always wants to pay/receive with a user B, b) the user B never wants to pay/receive with user C, and c) Everyone in game wants to pay to game host (admin/manager) and host may settle with everyone. The method comprising a step of mapping the one or more settlement rules with the one or more predefined activity templates on the computing device 102/104 by the artificial intelligence settlement engine 108. The activity templates may include, but not limited, online poker templates, live poker templates, or any other online/live game activities, non-game activities like a simple outdoor trip, and the like. The method further comprising a step of notifying at least one of: success of the one or more settlement rules; and failure of the one or more settlement rules; to the one or more users on the computing device 102/104. The method further comprising a step of mapping a notification process with one or more notification templates and also mapping with the one or more activity templates on the computing device 102/104 by the artificial intelligence settlement engine 108. The notification process may include, but not limited to, mobile app push notification, smart watch/gadget notification, sync with google/outlook calendar, mobile app push notification, in-app notification, email, and the like. The one or more notification templates comprise information for providing one or more notifications, the one or more notifications comprise one or more pending payment notifications and one or more acknowledgement notifications. The method further comprising a step of automatically customizing the one or more settlement rules based on various factors on the computing device 102/104 by the artificial intelligence settlement engine 108. The various factors may include, but not limited to, factors from artificial intelligence or machine learning based, or human assistant-based engine, factors from at least one of: 1. the history of last one year, if A always part of the game where B and C also there. Then automatic rule factors could be A, B, C want to settle amounts between themselves as a first priority; 2. If A, B are from same family, then automatic rule factors could be A, B want to settle amounts between themselves as a first priority; and if A doesn't have a good history of settling amount in given time with others, then A may get more notifications than others; 3. If A doesn't have a good history of settling amount in given time with others, then A may get more notifications than others, and the like. The method further comprising a step of identifying one or more shortest paths by the artificial intelligence settlement engine 108 to perform one or more settlements between the one or more users for the one or more game activities using at least one of: one or more dynamic parameters; and the one or more settlement rules; on the computing device 102/104. The one or more shortest paths comprise one or more payment gateways to settle amount between the one or more users. The one or more dynamic parameters may include, but not limited to, settle amount by matching payment gateways, settle amount for unmatching payment gateways with help of mediators, and the like. The one or more settlements comprise pending payment settlements, and game settlements. The one or more pending payment settlements comprise one or more payment transactions that need to be performed between the users. The one or more game settlements comprise settlements comprise one or more game transactions that need to be performed between the users.

In accordance with another exemplary embodiment of the present disclosure, the method comprising a step of customizing the one or more activity templates based on dynamic needs by the one or more users on the computing device 102/104 and then providing customized one or more activity templates to the artificial intelligence settlement engine 108. The dynamic needs may include, if the user has multiple payment gateways, the artificial intelligence settlement engine 108 may choose the payment gateway based on other person's payment gateways. The method further comprising a step of integrating the one or more settlement rules from one or more external systems into a settlement process sequence (shown in FIG. 3) by the artificial intelligence settlement engine 108 on the computing device 102/104. The one or more external systems comprise one or more third party systems and one or more money tracking systems. The settlement process sequence comprises the intelligence settlement engine 108 configured to add one or more settlement rules such settle with exact cash-in and cash-out groups on the computing device 102/104, a flexibility of buy-in configurations based on activity templates, and activity entities on the computing device 102/104, retain previously used configurations and settlement preferred rules for upcoming activity settlements if required, integrate with external services to import/export data in an excel format on the computing device 102/104, provide one or more settlement statements on the computing device 102/104, and generate one or more notifications on the computing device 102/104 to the users on pending payments. The method further comprising a step of reusing the one or more settlement rules by the artificial intelligence settlement engine 108 for one or more upcoming activity settlements. The upcoming activity settlements (like upcoming 2nd, $3^{rd}$, $4^{th}$ sequent activity settlement process) may include, but not limited to, one user may do n number of settlements in daily basis, for example, reusing current settlement process configurations/intelligence for next settlement process with same person or other people, and the like.

In accordance with another exemplary embodiment of the present disclosure, the method comprising a step of performing one or more game activities on the artificial intelligence settlement engine 108 by the one or more users through the computing device 102/104. The method further comprising a step of generating at least one of: a total payable amount; and a total receivable amount; on the computing device 102/104 by the artificial intelligence settlement engine 108 for the one or more game activities. The method comprising a step of generating one or more notifications on one or more pending payments for the one or more settlements to the one or more users by the artificial intelligence settlement engine 108 on the computing device 102/104.

In accordance with another exemplary embodiment of the present disclosure, a computer program product comprising a non-transitory computer-readable medium having a computer-readable program code embodied therein to be executed by one or more processors, the computer-readable program code including instructions to: enable one or more users on an artificial intelligence settlement engine 108 to provide one or more predefined activity templates and manage one or more settlement rules in the artificial intelligence settlement engine 108 from a computing device 102/104; map the one or more settlement rules with the one or more predefined activity templates on the computing device 102/104 by the artificial intelligence settlement engine 108; notify at least one of: success of the one or more settlement rules; and failure of the one or more settlement rules; to the one or more users on the computing device 102/104; map a notification process with one or more notification templates and also map with the one or more activity templates on the computing device 102/104 by the artificial intelligence settlement engine 108; automatically customize the one or more settlement rules based on various factors on the computing device 102/104 by the artificial intelligence settlement engine 108; and identify one or more shortest paths by the artificial intelligence settlement engine 108 to perform one or more settlements between the one or more users for one or more game activities using at least one of: one or more dynamic parameters; and the one or more settlement rules; on the computing device 102/104.

In accordance with another exemplary embodiment of the present disclosure, the artificial intelligence settlement engine 108 is configured to add the one or more settlement rules comprises at least one of: settle with exact cash-in groups; cash-out groups; on the computing device 102/104. The artificial intelligence settlement engine 108 comprises of buy-in configurations based on the one or more activity templates and one or more activity entities on the computing device 102/104. The artificial intelligence settlement engine 108 is configured to retain one or more previously used configurations and the one or more settlement rules for one or more upcoming activity settlements. The previously used configurations may include, but not limited to, one user may do n number of settlements in daily basis, for example, reusing current settlement process configurations/intelligence for next settlement process with same person or other people, and the like. The artificial intelligence settlement engine 108 is configured to integrate with one or more external services to import or export data an excel format on the computing device 102/104. The external services may include poker 2 online games, any third-party system/solution of type game/activity/process, for example: a simple money tracking system for a scheduled tour may export the data into this system, and hence users may perform settlement with advanced notifications and payment gateways. The artificial intelligence settlement engine 108 is configured to provide one or more settlement statements on the computing device 102/104 based on the one or more activity templates and the one or more users. The settlement statements may include, but not limited to, bankroll statement of any bank with details of payments and receipts, and the like.

In accordance with another exemplary embodiment of the present disclosure, the system configured to perform settlements based on game activities of users, comprising: an artificial intelligence settlement engine 108 configured to enable one or more users on the computing device 102/104 to provide one or more predefined activity templates and manage one or more settlement rules in the artificial intelligence settlement engine 108 from the computing device 102/104. The artificial intelligence settlement engine 108 may be configured to map the one or more settlement rules with the one or more predefined activity templates on the computing device 102/104. The artificial intelligence settlement engine 108 is configured to automatically customize the one or more settlement rules based on various factors on the computing device 102/104 and identify one or more shortest paths to perform one or more settlements between the one or more users for one or more game activities using at least one of: one or more dynamic parameters; and the one or more settlement rules; on the computing device 102/104. The artificial intelligence settlement engine 108 comprises at least one of: a settlement data importing module 212 is configured to import or export data from the one or more game activities in an excel format on the computing device 102/104; a cash settlement module 204 is configured to add or manage the one or more settlement rules in a settlement process on the computing device 102/104; and a settlement statement generating module 206 is configured to generate one or more settlement statements on the computing device 102/104 based on the one or more game activities of the one or more users. The artificial intelligence settlement engine 108 comprises a notification generating module 210 configured to notify at least one of: success of the one or more settlement rules; and failure of the one or more settlement rules; to the one or more users on the computing device 102/104.

In accordance with another exemplary embodiment of the present disclosure, the notification generating module 210 is configured to generate one or more notifications on one or more pending payments and provide one or more acknowledgements on successful payments on the computing device 102/104 to the one or more users. The artificial intelligence settlement engine 108 comprises a settlement rule identifying module 208 configured to identify the one or more settlement rules based on a primary friend's circle, a frequent player list on the computing device 102/104. The artificial intelligence settlement engine 108 is configured to map a notification process with one or more notification templates and also map with the one or more activity templates on the computing device 102/104. The artificial intelligence settlement engine 108 is configured to enable the one or more users to perform the one or more game activities comprise at least one of: one or more live (in person) game activities; and one or more poker games on the artificial intelligence settlement engine 108. The one or more live game activities may include, but not limited to, all sports, football, hockey, cricket, and the like. The non-game activities may include, but not limited to, scheduled tour, summer vacation trip, outdoor trip, and the like.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and subcombinations of the various features described hereinabove as well as variations and modifications thereof, which would occur to persons skilled in the art upon reading the foregoing description.

What is claimed is:

1. A method for performing settlements based on one or more game activities of one or more users, the method comprising:

providing the one or more users on an artificial intelligence settlement engine to one or more predefined activity templates and managing one or more settlement rules in the artificial intelligence settlement engine from a computing device, the one or more settlement rules comprise the artificial intelligence settlement engine configured to enable the one or more users to make one or more payments; to receive the one or more payments; to restrict to make the one or more payments; and to restrict to receive the one or more payments;

mapping, by the processor, the one or more settlement rules with the one or more predefined activity templates by the artificial intelligence settlement engine on the computing device, the one or more predefined activity templates comprise: one or more online poker templates; one or more live poker templates; one or more live game activities; and one or more non-game activities; the one or more live game activities; comprise all sports, football, hockey, cricket, the one or more non-game activities comprise a scheduled tour, a summer vacation trip, and an outdoor trip;

notifying, by the processor, success of the one or more settlement rules; and failure of the one or more settlement rules; to the one or more users on the computing device;

mapping, by the processor, a notification process with one or more notification templates and also mapping with the one or more predefined activity templates on the computing device by the artificial intelligence settlement engine, the notification process comprises mobile application push notifications; smart gadget notifications; outlook calendar notifications; and email notifications; the one or more notification templates comprise information for providing one or more notifications, the one or more notifications comprise one or more pending payment notifications and one or more acknowledgement notifications;

identifying one or more shortest paths by the artificial intelligence settlement engine to perform one or more settlements between the one or more users for the one or more game activities using: one or more dynamic parameters; and the one or more settlement rules; on the computing device, the one or more shortest paths comprise one or more payment gateways to settle amount between the one or more users, the one or more dynamic parameters comprise settle amount by matching payment gateways; and settle amount for unmatching payment gateways with help of mediators; the one or more settlements comprise one or more pending payment settlements and one or more game settlements;

integrating the one or more settlement rules from one or more external systems into a settlement process sequence by the artificial intelligence settlement engine on the computing device, the one or more external systems comprise one or more third party systems and one or more money tracking systems, the settlement process sequence comprises the artificial intelligence settlement engine configured to add one or more settlement rules such settle with exact cash-in and cash-out groups on the computing device, a flexibility of buy-in configurations based on the one or more predefined activity templates, and activity entities on the computing device, retain previously used configurations and settlement preferred rules for upcoming activity settlements if required, integrate with external services to import/export data in an excel format on the computing device, provide one or more settlement statements on the computing device, and generate the one or more notifications on one or more pending payments for the one more settlement statements on the computing device to the users;

generating at least one of: a total payable amount; and a total receivable amount; and providing one or more quantitative or qualitative feedbacks on the computing device by the artificial intelligence settlement engine for the one or more game activities.

2. The method of claim 1, further comprising a step of customizing the one or more predefined activity templates based on dynamic needs by the one or more users on the computing device and then providing customized the one or more predefined activity templates to the artificial intelligence settlement engine, the dynamic needs comprise the artificial intelligence settlement engine configured to select the one or more payment gateways based on user's payment gateways.

3. The method of claim 1, further comprising a step of reusing the one or more settlement rules by the artificial intelligence settlement engine for one or more upcoming activity settlements comprise reusing current settlement process configurations or artificial intelligence for next settlement process with the one or more users.

4. A system performing settlements based on one or more game activities of one or more users, the system comprising:

providing an artificial intelligence settlement engine for one or more predefined activity templates and managing one or more settlement rules in the artificial intelligence settlement engine from a the computing device, the one or more settlement rules comprise the artificial intelligence settlement engine configured to enable the one or more users to: to make one or more payments; to receive the one or more payments; to restrict to make the one or more payments; and to restrict to receive the one or more payments;

mapping, by the processor, the one or more settlement rules with the one or more predefined activity templates by the artificial intelligence settlement engine on the computing device, the one or more predefined activity templates comprise one or more online poker templates; one or more live poker templates; one or more live game activities; and one or more non-game activities; the one or more live game activities; comprise all sports, football, hockey, cricket, the one or more non-game activities comprise a scheduled tour, a summer vacation trip, and an outdoor trip;

notifying, by the processor, success of the one or more settlement rules; and failure of the one or more settlement rules; to the one or more users on the computing device;

mapping, by the processor, a notification process with one or more notification templates and also mapping with the one or more predefined activity templates on the computing device by the artificial intelligence settlement engine, the notification process comprises mobile application push notifications; smart gadget notifications; outlook calendar notifications; and email notifications; the one or more notification templates comprise information for providing one or more notifications, the one or more notifications comprise one or more pending payment notifications and one or more acknowledgement notifications;

identifying one or more shortest paths by the artificial intelligence settlement engine to perform one or more settlements between the one or more users for the one or more game activities using one or more dynamic parameters; and the one or more settlement rules; on the computing device, the one or more shortest paths comprise one or more payment gateways to settle amount between the one or more users, the one or more dynamic parameters comprise at least one of: settle amount by matching payment gateways; and settle amount for unmatching payment gateways with help of mediators; the one or more settlements comprise one or more pending payment settlements and one or more game settlements;

integrating the one or more settlement rules from one or more external systems into a settlement process sequence by the artificial intelligence settlement engine on the computing device, the one or more external systems comprise one or more third party systems and one or more money tracking systems, the settlement process sequence comprises the artificial intelligence settlement engine configured to add one or more settlement rules such settle with exact cash-in and cash-out groups on the computing device, a flexibility of buy-in configurations based on the one or more predefined activity templates, and activity entities on the computing device, retain previously used configurations and settlement preferred rules for upcoming activity settlements if required, integrate with external services to import/export data in an excel format on the computing device, provide one or more settlement statements on the computing device, and generate the one or more notifications on one or more pending payments for the one more settlement statements on the computing device to the users;

generating at least one of: a total payable amount; and a total receivable amount; and providing one or more quantitative or qualitative feedbacks on the computing device by the artificial intelligence settlement engine for the one or more game activities.

5. The system of claim 4, wherein the artificial intelligence settlement engine comprises a notification generating module configured to notify success of the one or more settlement rules; and failure of the one or more settlement rules; to the one or more users on the computing device.

6. The system of claim 4, wherein the artificial intelligence settlement engine is configured to map a notification process with one or more notification templates and also map with the one or more predefined activity templates on the computing device, the notification process comprises at least one of: mobile application push notifications; smart gadget notifications; outlook calendar notifications; and email notifications.

\* \* \* \* \*